United States Patent
Izumi

(10) Patent No.: US 7,920,568 B2
(45) Date of Patent: Apr. 5, 2011

(54) FRAME TRANSMISSION APPARATUS

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 12/036,352

(22) Filed: Feb. 25, 2008

(65) Prior Publication Data

US 2008/0205303 A1    Aug. 28, 2008

(30) Foreign Application Priority Data

Feb. 27, 2007   (JP) ................. 2007-046932

(51) Int. Cl.
*H04L 12/28* (2006.01)

(52) U.S. Cl. .............. 370/392; 370/401; 370/466

(58) Field of Classification Search ............ None
See application file for complete search history.

(56) References Cited

U.S. PATENT DOCUMENTS

| | | | | |
|---|---|---|---|---|
| 2006/0109802 A1* | 5/2006 | Zelig et al. | .......... | 370/258 |
| 2006/0209877 A1* | 9/2006 | Yamamoto | .......... | 370/452 |
| 2006/0277346 A1* | 12/2006 | Doak et al. | .......... | 710/305 |
| 2007/0058572 A1* | 3/2007 | Clauberg | .......... | 370/258 |
| 2007/0091829 A1* | 4/2007 | Ge et al. | .......... | 370/257 |
| 2007/0201360 A1* | 8/2007 | Hung et al. | .......... | 370/230 |

FOREIGN PATENT DOCUMENTS

| | | |
|---|---|---|
| JP | 2003-273920 A | 9/2003 |
| JP | 2003-348140 A | 12/2003 |

* cited by examiner

*Primary Examiner* — Kevin C Harper
(74) *Attorney, Agent, or Firm* — Myers Wolin, LLC.

(57) ABSTRACT

An apparatus including a first interface unit configured to perform frame communication processing with a ring network; a second interface unit configured to perform frame communication processing with a different network; a processing unit configured to convert a frame of a first format from the different network to a frame of a second format; a frame switching unit having at least one port connected to each of the first interface unit, the second interface unit and the processing unit and configured to switch the frame between ports; and a table configured to store frame identification information in correspondence with an output destination port identifier for an output port in the frame switching unit and frame conversion requirement information indicating whether conversion to the frame of the second format is required.

13 Claims, 25 Drawing Sheets

FIG. 12

| TRANSMISSION SOURCE MAC ADDRESS | VLAN TAG | DESTINATION ADDRESS FOR CORRESPONDING LOW-SPEED INTERFACE | RPR |
|---|---|---|---|
| ○○○ | ××○ | △△△ | Y |
| ○×○ | □○▽ | □△△ | N |
| ●○△ | ○◎× | □△▲ | N |

FIG. 13

| DESTINATION MAC ADDRESS | RPR |
|---|---|
| ○○○ | Y |
| ○×○ | N |
| ●○△ | N |

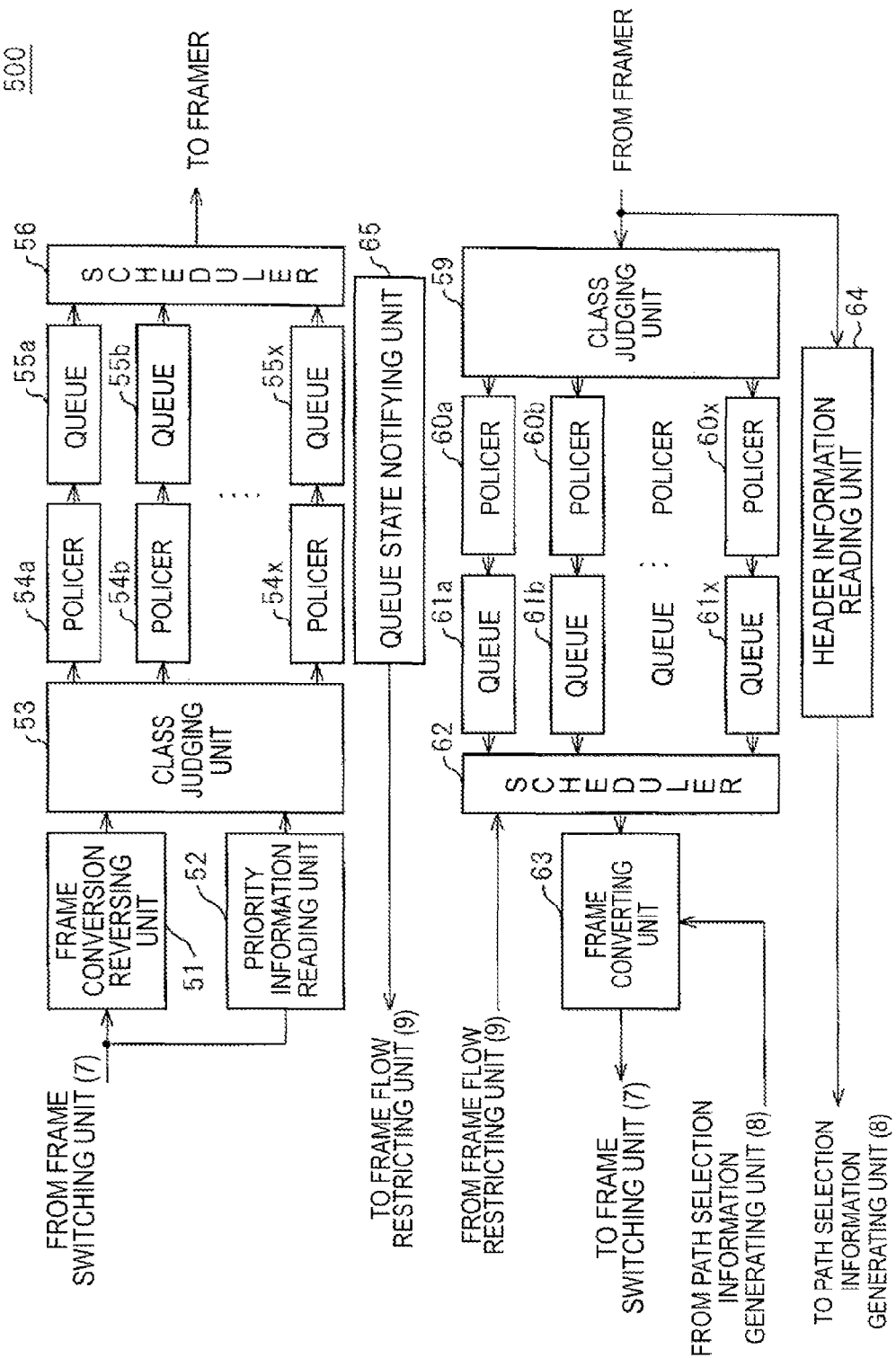

FRAME TRANSMISSION APPARATUS

TECHNICAL FIELD

The present invention relates to a frame (packet) transmission apparatus, and in particular to a station apparatus deployed in a RPR (Resilient Packet Ring) network to relay frames between a RPR network and a different transmission path.

SUMMARY

According to an aspect of an embodiment, an apparatus includes: a first interface unit configured to perform frame communication processing with a ring network; a second interface unit configured to perform frame communication processing with a different network; a processing unit configured to convert a frame of a first format from the different network to a frame of a second format; a frame switching unit having at least one port connected to each of the first interface unit, the second interface unit and the processing unit and configured to switch the frame between ports; and a table configured to store frame identification information in correspondence with an output destination port identifier for an output port in the frame switching unit and frame conversion requirement information indicating whether conversion to the frame of the second format is required.

BRIEF DESCRIPTION OF THE DRAWINGS

FIG. 12 shows a first example of an address table;

FIG. 13 shows a second example of the address table;

FIG. 30 is a block diagram showing a construction example of a frame switching unit interface of the low-speed interface shown in FIG. 28;

DETAILED DESCRIPTION OF THE EMBODIMENTS

Figure 1:
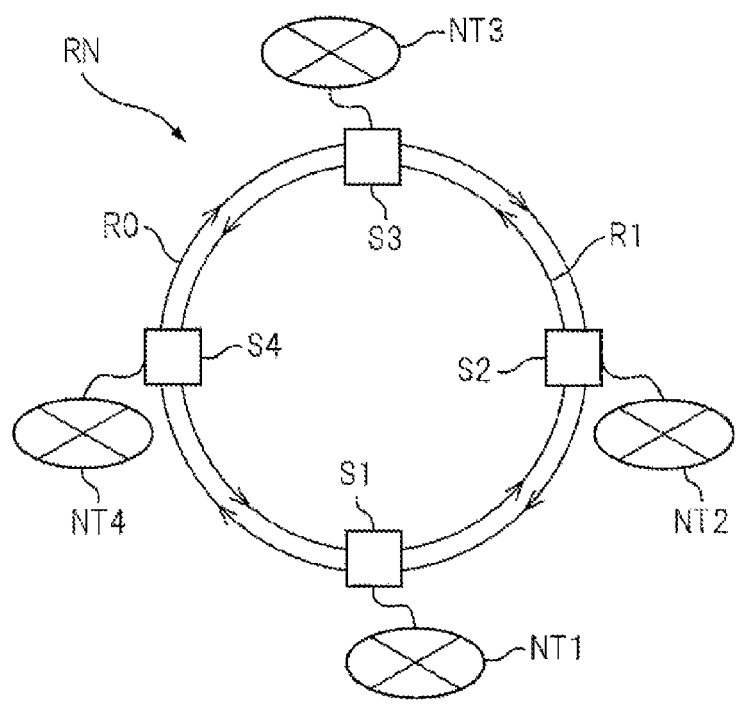
FIG. 1 is a diagram showing an example construction of an RPR network.

RPR is a network protocol technology relating to packet transmission and is stipulated in IEEE 802.17. This technology allows a restricted transmission bandwidth in a ring-form transmission line to be used fairly by each station in the RPR network, and thereby realizes what is known as fairness control. The technology includes functions for encapsulating packets received from a network other than the RPR network by a given station, transmitting the encapsulated packets within the RPR network, decapsulating the packets in another station, and transmitting the result to another network which corresponds to a packet destination.

This disclosure describes the best mode or modes of practicing the invention as presently contemplated. It is important to note that these embodiments are only examples to advise one of ordinary skill in the art of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the various views of the drawings, like reference characters designate like or similar parts.

FIG. 1 is a diagram showing an example construction of an RPR network. As shown in FIG. 1, the RPR network RN is constructed from station apparatuses S1 through S4, and a double-ring transmission line connecting them composed of a 0-side transmission line R0 (Ringlet 0) and a 1-side transmission line R1 (Ringlet 1). The station apparatuses S1 to S4 are connected to external networks NT1 through NT4 respectively, and the RPR network RN relays frames between these networks NT1 through NT4.

Figure 2:
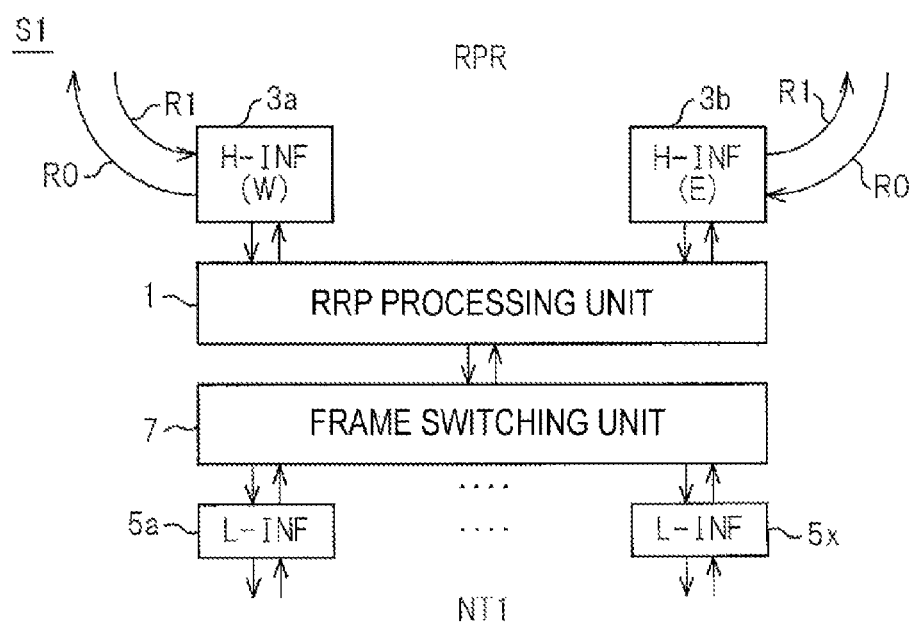
FIG. 2 is a block diagram showing an example construction of a station apparatus.

FIG. 2 is a block diagram showing an example construction of a station apparatus. As shown in FIG. 2, the station apparatus, for example S1, includes an RPR processing unit 1, high-speed interfaces (H-INF) 3a and 3b, low-speed interfaces (L-INF) 5a through 5x, and a frame switching unit 7.

The high-speed interfaces 3a and 3b perform processing to transmit and receive frames in the ringlet, which is the transmission path forming the RPR network. The high-speed interface 3a is provided facing in a direction for transmitting frames from the station apparatus S1 to the ringlet 0 (i.e. facing west). The high-speed interface 3b is provided facing in a direction for transmitting frames from the station apparatus S1 to the ringlet 1 (i.e. facing east).

The low-speed interfaces 5a through 5x transmit and receive frames to and from the external network NT1.

The RPR processing unit 1 performs RPR processing such as encapsulation of frames received from the low-speed interfaces 5a through 5x in RPR frames followed by transmission of the encapsulated frames to the RPR network RN, and decapsulation of the frames, among the RPR frames flowing in the RPR network, which are to be dropped (transmitted) to the external network NT1.

Figure 3:
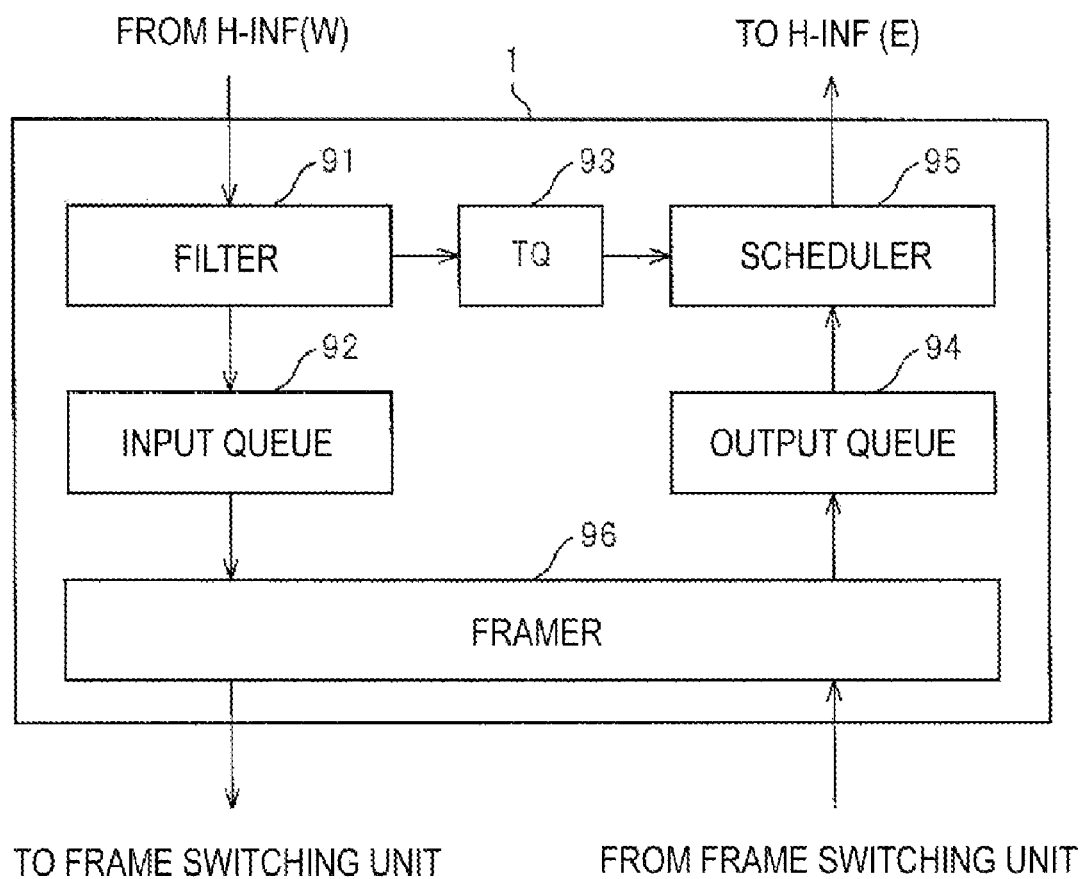
FIG. 3 is a block diagram showing an example construction of an RPR processing unit in the station apparatus shown in FIG. 2.

FIG. 3 is a block diagram showing an example construction of the RPR processing unit 1 in the station apparatus S1 shown in FIG. 2. For simplicity, only the flow of RPR frames relating to the ringlet 1 is shown.

As shown in FIG. 3, the RPR processing unit 1 includes a filter 91, an input queue 92, transit queue (TQ) 93, an output queue 94, a scheduler 95 and a framer 96.

The filter 91 extracts RPR frames to be dropped to the external network NT1 from among the RPR frames received from ringlet 1 by the high speed interface 3a, transmits the extracted frames to the input queue 92, and transmits the other RPR frames to a transit queue 93.

The input queue 92 stores RPR frames extracted by the filter 91 until transmission to the external network NT1. The transit queue 93 temporarily stores the RPR frames, among the RPR frames received by the station apparatus S1, which are not to be dropped until transmission on ringlet 1 to a next station apparatus S2 via the high-speed interface 3b.

The output queue 94 temporarily stores frames to be transmitted to ringlet 1 (eastwards) received from the external network NT1, and the scheduler 95 controls a timing for transmission of each frame stored in the transit queue 93 and the output queue 94 to ringlet 1 (eastwards).

The framer 96 encapsulates non-RPR frames in RPR frames and decapsulates RPR frames to form non-RPR frames.

The frame switching unit 7 shown in FIG. 2 transmits non-RPR frames received from the external network NT1 via the low-speed network interfaces 5a through 5x to the RPR processing unit 1. The frame switching unit 7 then transmits decapsulated non-RPR frames dropped by the RPR processing unit 1 to any one of the low-speed network interfaces 5a through 5x. At this point, the frame switching unit 7 consults destination addresses of the frames decapsulated by the RPR processing unit 1, determines one of the low-speed network interfaces 5a through 5x for each frame, and transmits the frames accordingly.

Figure 4:
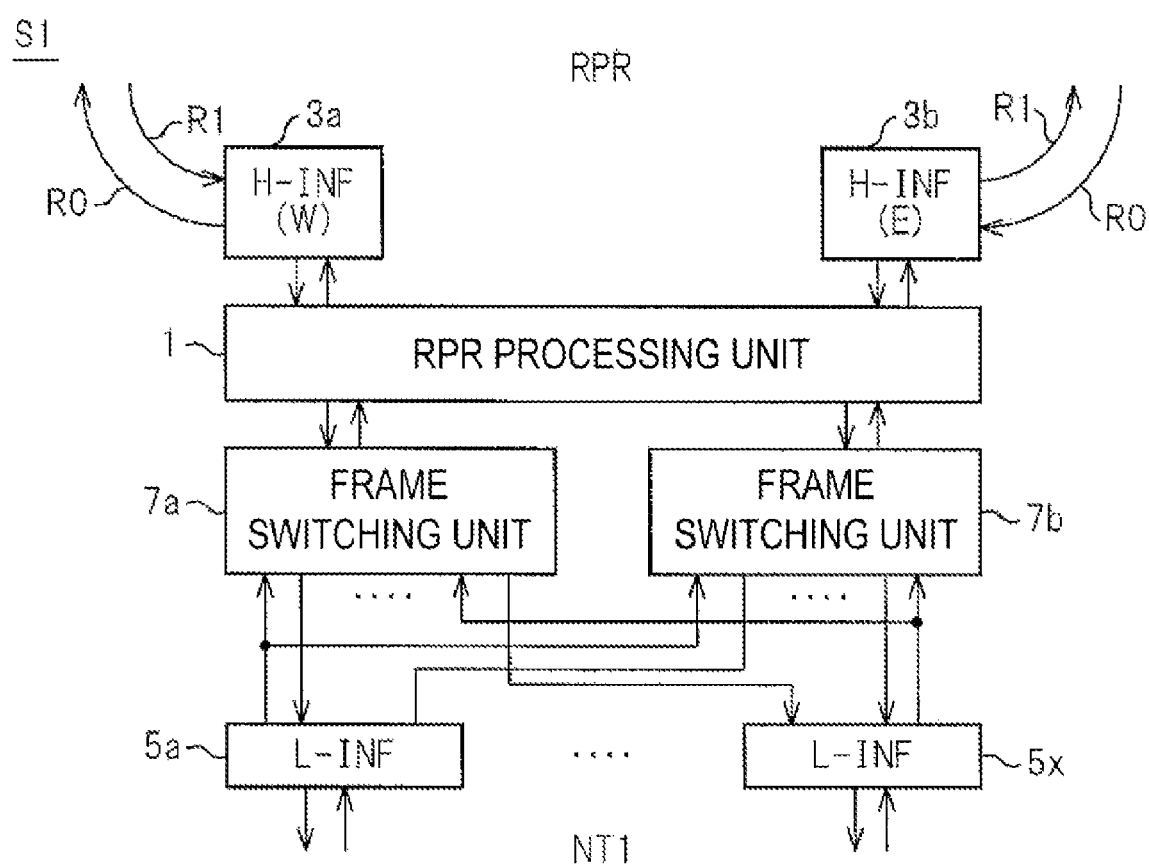
FIG. 4 is a block diagram showing a construction example of a station apparatus similar to FIG. 2 with redundancy in the frame switching unit.

In some embodiments, the station apparatus S1 is constructed to include redundancy in order to improve stability. FIG. 4 is a block diagram showing a construction example of a station apparatus with a frame switching unit 7 including redundancy, and FIG. 5 is a block diagram showing a construction example of a station apparatus with an RPR processing unit 1 including redundancy.

Figure 5:
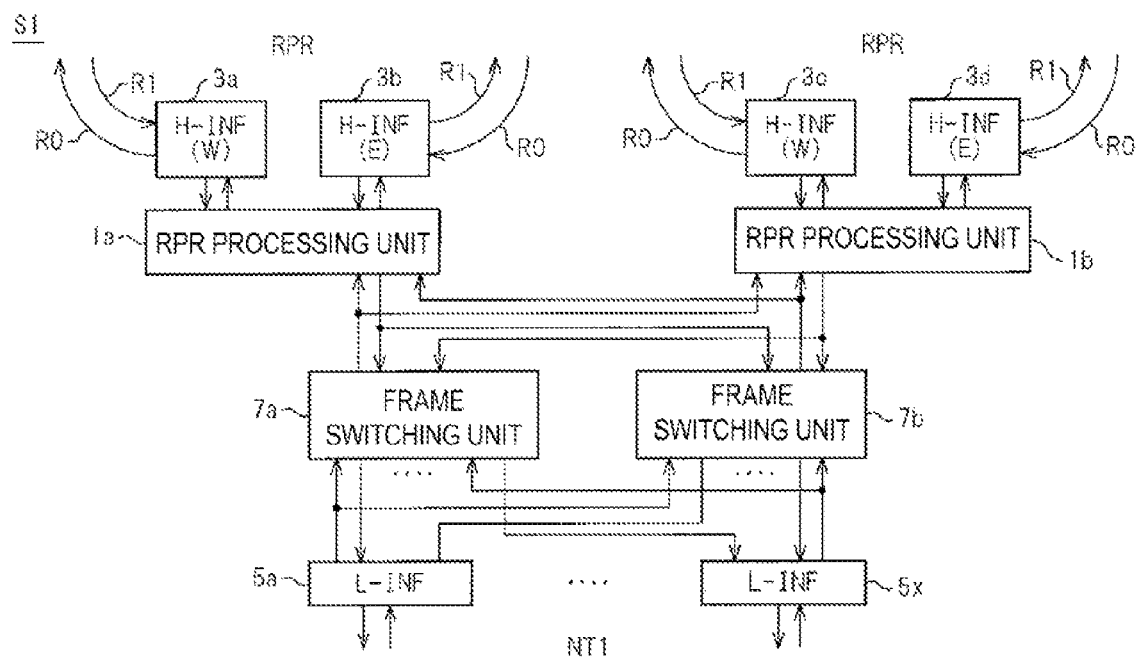
FIG. 5 is a block diagram showing a construction example of a station apparatus similar to FIG. 4 with redundancy in the RPR processing unit.

Note that since the high-speed network interfaces 3a to 3d in FIG. 5 all have the same functions, the expression "high-speed network interface 3" is sometimes used to describe a single representative high-speed network interface. Similarly, the expression "low-speed network interface 5" is sometimes used when discussing a single representative low-speed network interface among the low-speed network interfaces 5a through 5x.

The RPR protocol has strengths which include a strong damage recovery capability and a capability to allocate bandwidth fairly among the stations and weaknesses including a reduced transmission efficiency due to overheads caused by the encapsulation to form RPR frames. Also, the processing for encapsulation to form RPR frames and decapsulation from the RPR frames causes frame management delays.

Hence, when transmitting point-to-point between clients under differing station apparatuses without requiring RPR functionality and without using RPR, it is more efficient to avoid RPR processing, by, for example, transmitting regular MAC frames, and having each frame switching unit 7 forward the frames using the MAC addresses.

However, since in the construction of the station apparatus shown in FIG. 2, the RPR processing unit 1 exchanges frames directly with the high speed interface 3, all frames to be communicated with other station apparatuses via the high-speed interface 3 are subjected to RPR processing. Hence, frames which are to be transmitted point-to-point between clients and do not require RPR functionality (i.e. frames for which RPR processing is unnecessary) undergo RPR processing, and RPR cards are therefore installed in excess.

Also, when a bypass circuit is provided between the high speed interface 3 and the low-speed interface 5 in the construction of the station apparatus shown in FIG. 2 in order to bypass the RPR processing unit 1 and allow a direct exchange of the frames not requiring RPR processing, an amount of wiring on the backboard is considerably increased.

Moreover, even if the circuit to bypass the RPR processing unit 1 is provided in the manner described above, it is still not possible, for reasons described below, to use the RPR network circuit while intermixing the bandwidth allocated for the RPR frames and the bandwidth allocated for the MAC frames. Since the bandwidth allocated for the RPR frames and the bandwidth allocated for the MAC frames must therefore be fixed, the usage efficiency of the bandwidth of the RPR network RN is reduced.

Figure 6A:
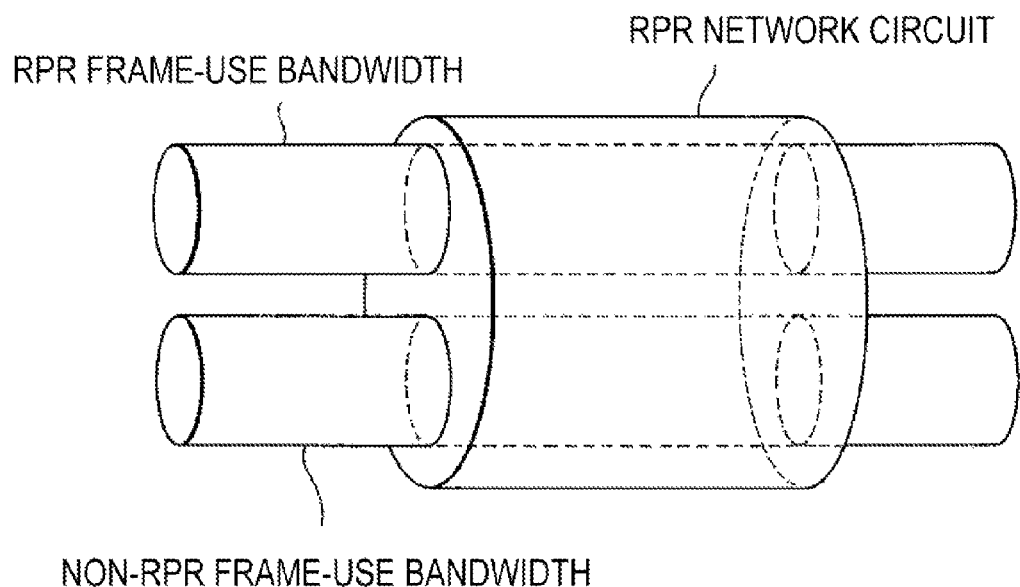
FIG. 6A is a schematic diagram showing a state of use of an RPR network circuit having fixed transmission bandwidths for the RPR frames and regular MAC frames.
Figure 6B:
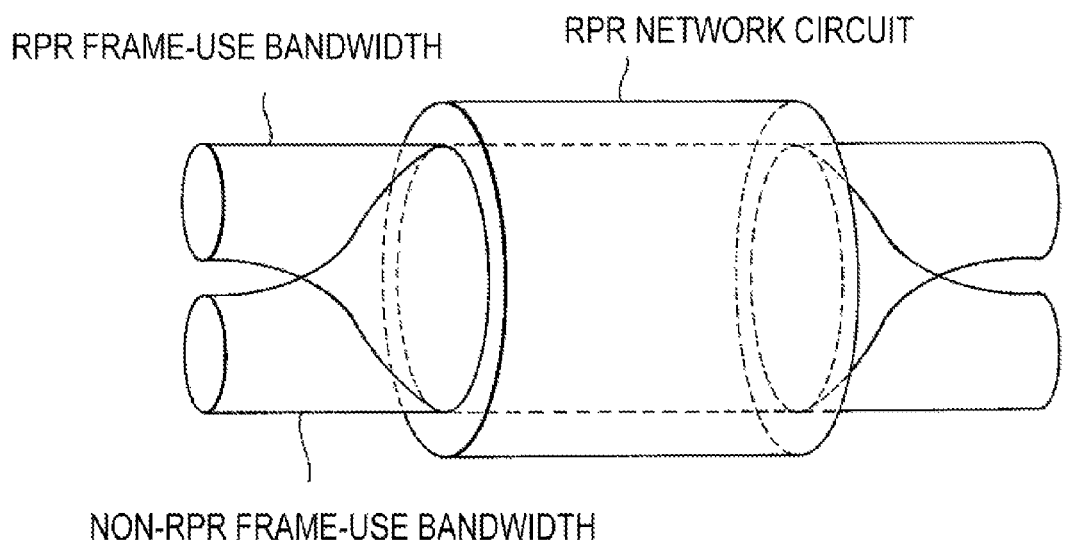
FIG. 6B is a schematic diagram showing a state of use of an RPR network circuit in which the transmission bandwidth for the RPR frames and the transmission bandwidth for RPR are intermixed.

FIG. 6A is a schematic diagram showing a state of use of an RPR network circuit having fixed transmission bandwidths for the RPR frames and regular MAC frames. FIG. 6B is a schematic diagram showing a state of use of an RPR network circuit having intermixed transmission bandwidths for the RPR frames and regular MAC frames.

FIG. 6A shows a fixed allocation of transmission bandwidth. When the total bandwidth is, for instance, 10 Gbps, FIG. 6A shows the case in which 5 Gbps of bandwidth are allocated for RPR frames and the remaining 5 Gbps of bandwidth are allocated to non-RPR frames.

FIG. 6B, on the other hand, shows a dynamic allocation of transmission bandwidth. When the total bandwidth is, for instance, 10 Gbps, FIG. 6A shows the case in which, for a given point in time, 4 Gbps of bandwidth are allocated for RPR frames and the remaining 6 Gbps of bandwidth are allocated to non-RPR frames.

In other words, when the bandwidth for the RPR frames and the bandwidth for the regular MAC frames is intermixed, further statistical multiplexing of the non-RPR frames into the RPR frames is necessary. However, since processing to carry out this further statistical processing is performed independently of the RPR protocol, there is a risk that control frames which transmit control information used by the RPR protocol will be discarded by the further statistical multiplexing. Hence, when the bandwidths for the two types of frame are intermixed by simply statistically multiplexing the RPR frames and regular MAC frames, there is a risk that the RPR protocol will cease to function normally.

Figure 7:
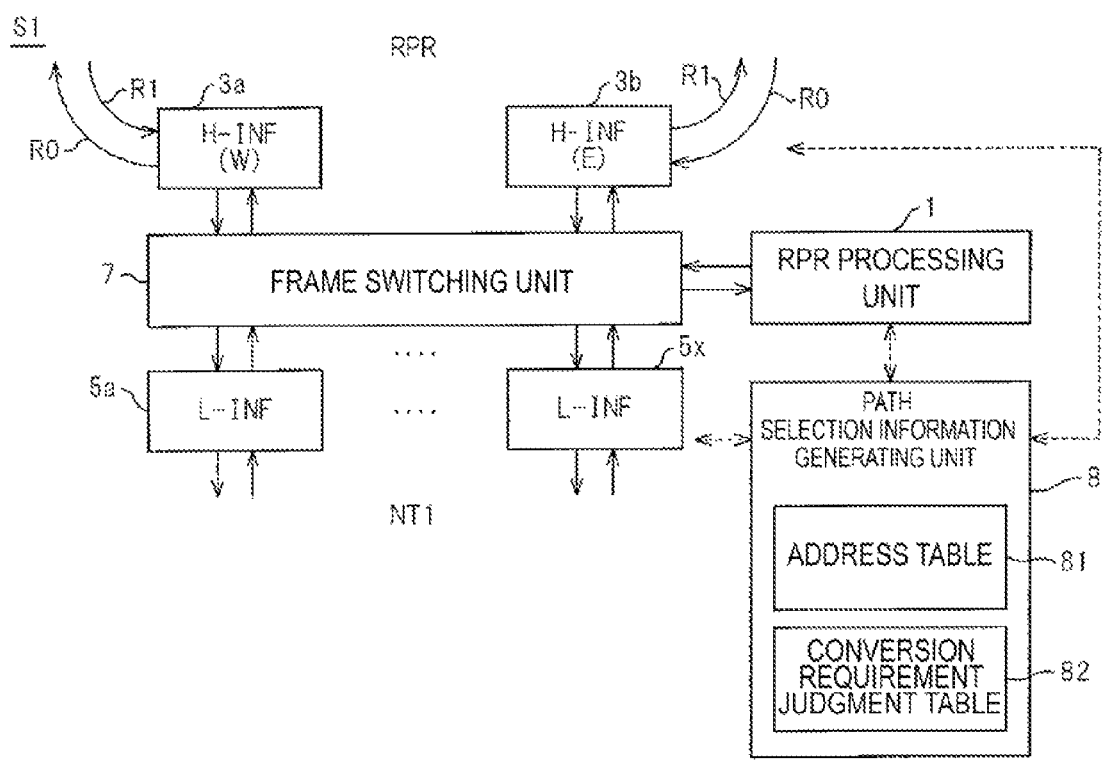
FIG. 7 is a block diagram showing a construction of a first embodiment of a station apparatus.

FIG. 7 is a block diagram showing a construction of a first embodiment of a station apparatus. The station apparatus, for example S1, is disposed in the RPR network RN described with reference to FIG. 1, and serves to connect the ringlet 0 and the ringlet 1 to the external network NT1 and relay RPR frames and non-RPR frames.

As shown in FIG. 7, the station apparatus S1 includes the high-speed interfaces 3a and 3b for performing processing to transmit and receive frames to and from the ringlet R0 and the ringlet R1, the low-speed interfaces 5a through 5x for communication of frames with the external network NT1, and the RPR processing unit for performing RPR processing such as drop processing (transmission processing) on frames from the ringlet R0 and the ringlet R1 and addressing of frames to be transmitted to the ringlet R0 and the ringlet R1.

Here in this example, the high-speed interfaces 3a and 3b are called a first interface unit, and the low-speed interfaces 5a through 5x are called a second interface unit.

Further, the MAC frames communicated with the external network NT1 are called frames of a first format, and RPR frames communicated with the ringlet R0 and the ringlet R1 are called frames of a second format. Further, the RPR processing unit 1 for converting from MAC frames to RPR frames is called a processing unit.

The station apparatus S1 includes the frame switching unit 7 which has a plurality of connection ports and is capable of transmitting frames received via the connection ports to any other connection ports (i.e. capable of switching frames between any pair of connection ports). The high-speed interfaces 3a and 3b, the low-speed interfaces 5a through 5x, and the RPR processing unit 1 are connected to connection ports.

When outputting a frame to the frame switching unit 7, the high-speed interface 3, the low-speed interface 5, and the RPR processing unit 1 append address information corresponding to the connection port for whichever of the high-speed interface 3, the low-speed interface 5, and the RPR processing unit 1 is the transmission target.

The frame switching unit 7 is constructed to be capable of consulting this address information and outputting the frame to the corresponding port. Hence, the frame switching unit 7 can transmit a frame inputted from a given connection port to a desired other connection port. This type of frame switching unit can be realized easily using a conventional router apparatus.

Figure 8A:
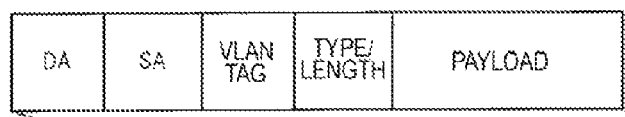
FIG. 8A shows a format of a MAC frame.
Figure 8B:
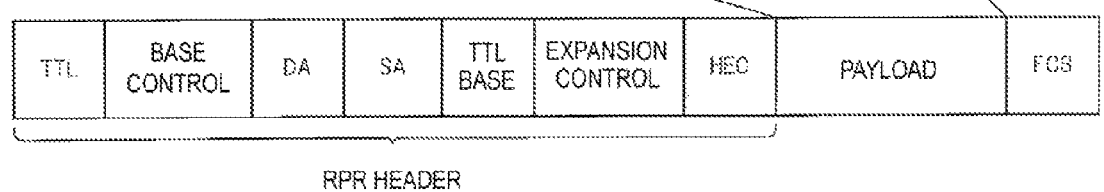
FIG. 8B is a diagram showing a format of an RPR frame encapsulating the MAC frame shown in FIG. 8A.

FIG. 8A shows an example of a MAC frame format and FIG. 8B shows an example of a format for an RPR frame encapsulating the MAC frame shown in FIG. 8A. Here, the processing to convert from the RPR frame format of FIG. 8B to the MAC frame format shown in FIG. 8A is known as decapsulation.

Figure 9A:
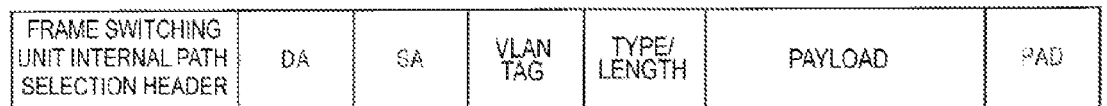
FIGS. 9A & 9B show the frames of 8A and 8B, respectively, appended with a frame switching unit path selection-use header.

When transmitting a MAC frame of the type shown in FIG. 8A to the frame switching unit 7, the high-speed interface 3, the low-speed interface 5, and the RPR processing unit 1 append a frame switching unit path selection-use header to the MAC frame. A MAC frame appended with the frame switching unit path selection-use header is shown FIG. 9A.

Besides the address information indicating a transmission destination connection port for the frame in the frame switching unit 7, the frame switching unit path selection-use header includes priority information which defines a level of priority for transmission of the frame in a manner which is described later. Note that, in FIG. 9A, the "PAD" data appended to the end of the MAC frame is added to maintain a constant frame length.

Figure 9B:

When transmitting an RPR frame of the type shown in FIG. 8B to the frame switching unit 7, the high-speed interface 3 and the RPR processing unit 1 append a frame switching unit path selection-use header to the RPR frame. An RPR frame appended with the frame switching unit path selection-use header is shown in FIG. 9B.

Thus, by connecting the high-speed interface 3 to the low-speed interface 5, the RPR processing unit 1 to the high-speed interface 3, and the RPR processing unit 1 to the low-speed interface 5 via the same frame switching unit 7, the path for transmitting frames between the high-speed interface 3 and the low-speed interface 5 can be easily switched between a path via the RPR processing unit 1 and a path not via the RPR processing unit 1. This arrangement is described with reference to FIG. 10.

The following assumes a construction in which all MAC frames communicated with the external network NT1 via the low-speed interface 5b are converted into RPR frames and transmitted over the RPR network RN, while all MAC frames communicated via the low-speed interface 5a are transmitted over the RPR network RN without being converted to RPR frames.

When the low-speed interface 5b outputs frames to the frame switching unit 7, the MAC frames are transmitted to the RPR processing unit 1 via a path 901 in the frame switching unit 7 by indicating the connection port connected to the RPR processing unit 1 using a destination address. The RPR processing unit 1 then converts the MAC frames to RPR frames. When the RPR processing unit 1 outputs frames to the frame switching unit 7, the RPR frames are transmitted to the high-speed interface 3 via a path 902 in the frame switching unit 7 by indicating the connection port connected to the high-speed interface 3 using the destination address. The RPR frames are then transmitted to the ringlet corresponding to the high-speed interface 3.

On receipt of an RPR frame, the high-speed interface 3 outputs the frame to the frame switching unit 7, indicating a connection port connecting to the RPR processing unit 1 using the destination address. As a result, the RPR frame is transmitted to the RPR processing unit 1 via a path 903. In the RPR processing unit the frame is decapsulated to give a non-RPR frame (i.e. a MAC frame). Then, when the RPR processing unit 1 outputs the MAC frame to the frame switching unit 7, the MAC frame is transmitted to the low-speed interface 5b via a path 904 by indicating the connection port connected to the low-speed interface 5b using the destination address.

On the other hand, when the low-speed interface 5a outputs a frame to the frame switching unit 7, the MAC frame is transmitted directly to the high-speed interface 3 via a path 905 by indicating the connection port connected to the high-speed interface 3 using the destination address, and is transmitted to a ringlet corresponding to the high-speed interface without being converted to an RPR frame.

On receipt of a non-RPR frame from the corresponding ringlet, the high-speed interface 3 outputs the frame to the frame switching unit 7, imparting a switching unit path selection-use header with the connection port connected to the low-speed interface 5a as the destination address. As a result, the non-RPR frame is transmitted directly to the low-speed interface 5a via a path 906. FIGS. 11A through 11E are frame formats corresponding to parts A through E of FIG. 10 respectively.

With this construction, regular MAC frames can be transmitted between the RPR high-speed interface 3 and the low-speed interface 5 without going via the RPR processing unit 1, and it is therefore possible to transmit non-RPR frames together with RPR frames over the RPR network RN.

The station apparatus S1 further includes a path selection information generating unit 8 for supplying to the various processing units (including the high-speed interface 3, the low-speed interface 5, and the RPR processing unit 1), address information which is appended by the various processing units when transmitting a frame to the frame switching unit 7 and specifies an output port of the frame switching unit 7.

FIG. 12 shows a first example of an address table 81 stored in the path selection information generating unit 8. The path selection information generating unit 8 includes a MAC address learning function. In other words, on transmission to the frame switching unit 7 of a MAC frame received from external network NT1 by the low-speed interface 5, the path selection information generating unit 8 stores the MAC address of a transmission source client apparatus, which is an SA (Source Address) in the MAC frame (first column in the table shown in FIG. 12), and tag information such as VLAN tags (second column). At this point, the path selection information generating unit 8 stores (in the third column) the address information, which is an address of the frame switching unit 7 connection port connected to the low speed interface 5, in combination with the above-described MAC address and VLAN tag.

The MAC address of the transmission source client apparatus is transmission source identification information included in the received frames. It is also possible to use tag information, such as the VLAN tag, as the transmission source identification information. Thus, the MAC address and tag information correspond to frame identification information.

Moreover, the address of the connection port of the frame switching unit 7 may be called port identification information of the frame switching unit 7. Hence, the address of the connection port corresponds to an output destination port identifier.

The address table 81 stores the transmission source identification information included in the received frames in correspondence with the port identification information.

Having sequentially stored the transmission source MAC addresses and the connection port addresses in this way, the path selection information generating unit 8 can, when a frame to be transmitted to the low speed interface 5 appears, search the table of "transmission source MAC addresses" of FIG. 12 using destination addresses for received MAC frames as the search key to discover the low-speed interface, among the plurality of low speed interfaces, to which the frame should be transmitted. When this processing generates a hit, the corresponding connection port identification information (i.e. the destination address stored in "the destination address for the corresponding low-speed interface" column shown in FIG. 12) can be used to specify the connection port which is the transmission destination. Note that it is possible to search using VLAN tags as the search key rather than the destination MAC addresses, or to search using a combination of the destination MAC address and the VLAN tag as the search key.

The address table 81 also stores information (in a fourth column denoted "RPR" in FIG. 12) identifying whether a RPR frame format or a non-RPR frame format is to be used over the RPR network RN when transmitting the frames received from the client apparatuses. In the example table shown in FIG. 12, a "Y" in the RPR column indicates that the frames communicated with the client apparatus having the corresponding MAC address (first row) are to be transmitted as RPR frames, and an "N" in the RPR column indicates that the frames communicated with the client apparatus having the corresponding MAC address (second and third rows) are to be transmitted as non-RPR frames.

The information in the "RPR" column indicates whether or not it is necessary to convert the MAC frame received by the low-speed interface 5 to an RPR frame. Here, the information in the RPR column can be called frame conversion requirement information. The address table 81 stores the transmission source identification information included in the received frames in correspondence with the frame conversion requirement information.

Thus, the address table 81 is a table for storing the transmission source identification information included in the received frames in correspondence with the port identification information and the frame conversion requirement information. Note also that the address table 81 is sometimes simply referred to as the "table".

The MAC addresses of the destination client apparatuses of the MAC frames received from the external network NT1 (i.e. the DA (Destination Addresses) of the MAC frames) may be used to indicate whether conversion to the RPR frame format is required. To achieve this, a conversion requirement judgment table 82 may be provided in the path selection information generating unit 8.

An example of the conversion requirement judgment table 82 is shown in FIG. 13. The conversion requirement judgment table 82 stores in a "destination MAC address" column, which is the first column in the table, the DA included in the MAC frame when the low speed interface 5 has received the MAC frame from the external network NT1 and transmits the received MAC frame to the frame switching unit 7. The conversion requirement judgment table 82 also stores in an "RPR" column, which is the second column in the table, frame conversion requirement information which is information specifying whether frames communicated from the client apparatuses indicated in the "destination MAC address" column are to be transmitted over the RPR network RN in the RPR frame format or in the non-RPR frame format. In other words, the conversion requirement judgment table 82 stores the transmission destination identification information in correspondence with the frame conversion requirement information.

The frame conversion requirement information stored in the RPR column can be determined automatically by the path selection information generating unit 8 for each client apparatus based on predetermined rules. For instance, the need for RPR frame conversion may be determined depending on the VLAN tag information.

Alternatively, the path selection information generating unit 8 may set all the frame conversion requirement information to a common default value for the newly learned MAC addresses, and then alter the individual values based on operations by an operator or by a frame flow restricting unit 9 (see FIG. 2) which is described later.

Figure 14:
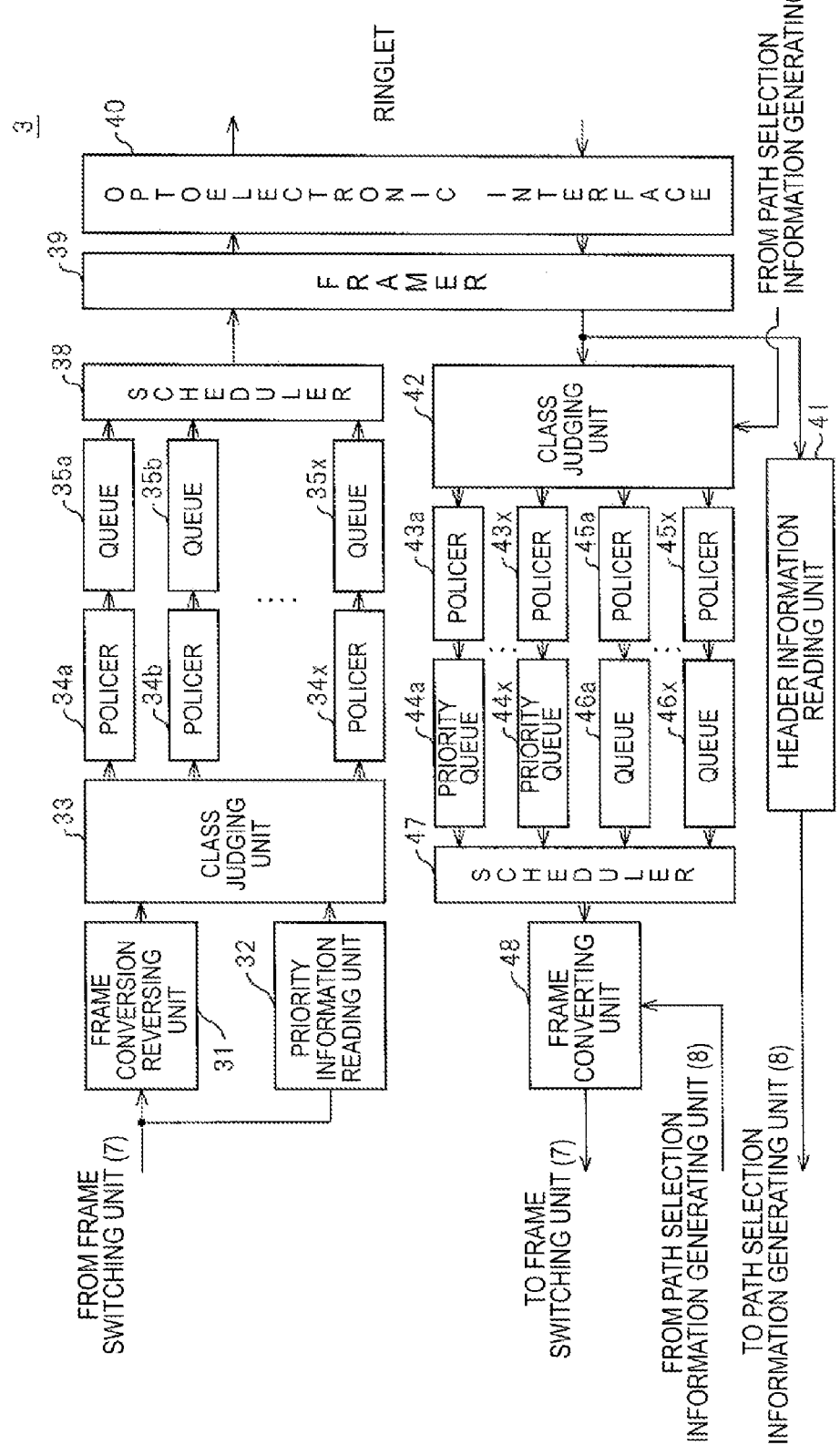
FIG. 14 is a block diagram showing an example construction of a high-speed interface shown in FIG. 7.

FIG. 14 is a block diagram showing an example construction of the high-speed interface 3 shown in FIG. 7. As shown in FIG. 14, the high-speed interface 3 includes a class judging unit 33 for classifying frames transmitted from the frame switching unit 7 according to an order of priority, queues 35*a* through 35*x* for storing the classified frames in separate classes, policers 34*a* through 34*x* for discarding frames inputted to the queues 35*a* through 35*x* to prevent overflow in the queues 35*a* through 35*x*, and a scheduler 38 for sequentially selecting frames for transmission to the ringlet corresponding to the high-speed interface 3 based on levels of priority of the classes of the frames stored in the queues 35*a* through 35*x*.

The high-speed interface 3 further includes a framer 39 for performing framing processing to frame the MAC frames or RPR frames to be transmitted over the optical communications network and deframing processing to deframe MAC frames or RPR frames received from the optical communications network, and an optoelectronic interface 40 for converting between electronic and optical signals.

The high-speed interface 3 further includes a class judging unit 42 for classifying frames received from the ringlet corresponding to the high-speed interface 3 in order of priority, priority queues 44*a* through 44*x* for separately storing the frames classified with a higher level of priority than other classified frames, queues 46*a* through 46*x* for separately storing frames classified with a lower level of priority, policers 43*a* through 43*x* for discarding frames inputted to the priority queues 44*a* through 44*x* to prevent frame overflow from the queues 44*a* to 44*x*, policers 45*a* through 45*x* for discarding frames inputted to the queues 46*a* through 46*x* to prevent frame overflow from the queues 46*a* to 46*x*, and a scheduler 47 for sequentially selecting frames for transmission to the frame switching unit 7 based on a level of priority of the classes of the frames stored in the priority queues 44*a* through 44*x* and the queues 46*a* through 46*x*.

The high-speed interface 3 further includes a frame conversion reversing unit 31 for performing a reverse conversion on MAC frames (see FIG. 9A) transmitted from the low-speed interface 5 via the frame switching unit 7 to original MAC frames (see FIG. 8A) by removing the frame switching unit path selection-use header and the PAD data, and for performing a reverse conversion on RPR frames (see FIG. 9B) transmitted from the RPR processing unit 1 via the frame switching unit 7 to original RPR frames (see FIG. 8B) by removing the frame switching unit path selection-use header and the PAD data. The high speed interface 3 further includes a priority information reading unit 32 for reading the priority information included in the frame switching unit path selection-use headers.

The high-speed interface 3 further includes a frame converting unit 48 for appending the frame switching unit path selection-use header and the PAD data to the frames to be transmitted from the scheduler 47 to the frame switching unit 7.

The priority information read from the priority information reading unit 32 is passed to the class judging unit 33 and used in the classification by the class judging unit 33.

As described later, the priority information included in the frame switching unit path selection-use header appended to the RPR frames by the frame converting unit 27 (see FIG. 17) of the RPR processing unit 1 is set to indicate a higher level of priority than the priority information included in the frame switching unit path selection-use header appended by the frame converting unit 63 (see FIG. 15) to non-RPR frames transmitted from the low-speed interface 5 to the high-speed interface 3.

Hence, the class judging unit 33 constantly classifies the RPR frames transmitted from the RPR processing unit 1 to the high-speed interface 3 into a higher priority class than the non-RPR frames transmitted from the low-speed interface 5 to the high-speed interface 3. Consequently, the scheduler 38 constantly prioritizes RPR frames when transmitting to the ringlet.

The high-speed interface 3 further includes a header information reading unit 41 for reading the destination MAC addresses of the frames received from the corresponding ringlet, the transmission source MAC addresses, and the VLAN tags and passing the read information to the path selection information generating unit 8.

On receipt of a destination MAC address read by the header information reading unit 41, the path selection information generating unit 8 searches the "transmission source MAC address" column in the address table 81 shown in FIG. 12 using the destination MAC address as a search key. The path selection information generating unit 8 then acquires the connection port address stored in the "destination address for corresponding low-speed interface" column of the record hit by the search. At this point, the path selection information generating unit 8 may use the VLAN tag information as the search key rather than the destination MAC address.

By searching the "source MAC address" column in the address table 81 shown in FIG. 12 using the destination MAC address read by the header information reading unit 41 as the search key and acquiring the frame conversion requirement information stored in the RPR column of the record hit by the search, the path selection information generating unit 8 determines whether the frame received from the ringlet corresponding to the high-speed interface 3 is an RPR frame or a non-RPR frame.

Alternatively, the path selection information generating unit 8 may search the "destination MAC address" column of the conversion requirement judgment table 82 shown in FIG. 13 using the transmission source MAC address read by the header information reading unit 41 as the search key. By acquiring the frame conversion requirement information stored in the "RPR" column of the record hit by the search, the path selection information generating unit 8 then determines whether the frame received from the ringlet corresponding to the high-speed interface 3 is an RPR frame or a non-RPR frame.

Having determined whether the frame received from the ringlet corresponding to the high-speed interface 3 is an RPR frame or a non-RPR frame, the path selection information generating unit 8 passes RPR setting information indicating one or the other to the class judging unit 42. The class judging unit 42 classifies the received frames based on the RPR setting information, and transmits RPR frames to the priority queues 44*a* to 44*x* and non-RPR frames to the queues 46*a* through 46*x*.

When the frame received from the ringlet corresponding to the high-speed interface 3 is a non-RPR frame, the path selection information generating unit 8 passes to the frame converting unit 48 a destination address for the low-speed interface 5 (see column 3 of FIG. 12) obtained based on the destination MAC address or VLAN tag information read by the header information reading unit 41, as a destination address for inclusion in the frame switching unit path selection-use header to be appended to the non-RPR frame by the frame converting unit 48.

Thereafter, when the non-RPR frame is outputted to the frame switching unit 7, the frame switching unit 7 transmits the non-RPR frame to the connection port indicated by the destination address included in the frame switching unit path selection-use header. Consequently, the non-RPR frame is transmitted to the low-speed interface 5 which communicates with the client apparatus indicated by the same destination MAC address.

When, on the other hand, it is determined that the frame transmitted from the ringlet corresponding to the high-speed interface 3 is an RPR frame, the path selection information generating unit 8 supplies the known destination address for the RPR processing unit 1 to the frame converting unit 48.

Thereafter, when the RPR frame is outputted to the frame switching unit 7, the frame switching unit 7 transmits the RPR frame to the connection port indicated by the destination address included in the frame switching unit path selection-use header. Consequently, the RPR frame is transmitted to the RPR processing unit 1.

The frame converting unit 48 may include the priority information when appending the frame switching unit path selection-use header to the frames. At this point the frame converting unit 48 may also perform the following processing to ensure that when non-RPR frames are being transmitted from the high-speed interface 3 to the low-speed interface 5, the frames dropped from the RPR network by the RPR processing unit 1 are received with priority by the low-speed interface 5. In other words, the frame converting unit 48 may ensure that a later-described frame converting unit 27 of the RPR processing unit 1 (see FIG. 17) sets the priority lower in the priority information assigned to the non-RPR frames to be outputted from the RPR processing unit 1 to the low-speed interface 5 than in the priority information assigned to the dropped non-RPR frames.

Figure 15:
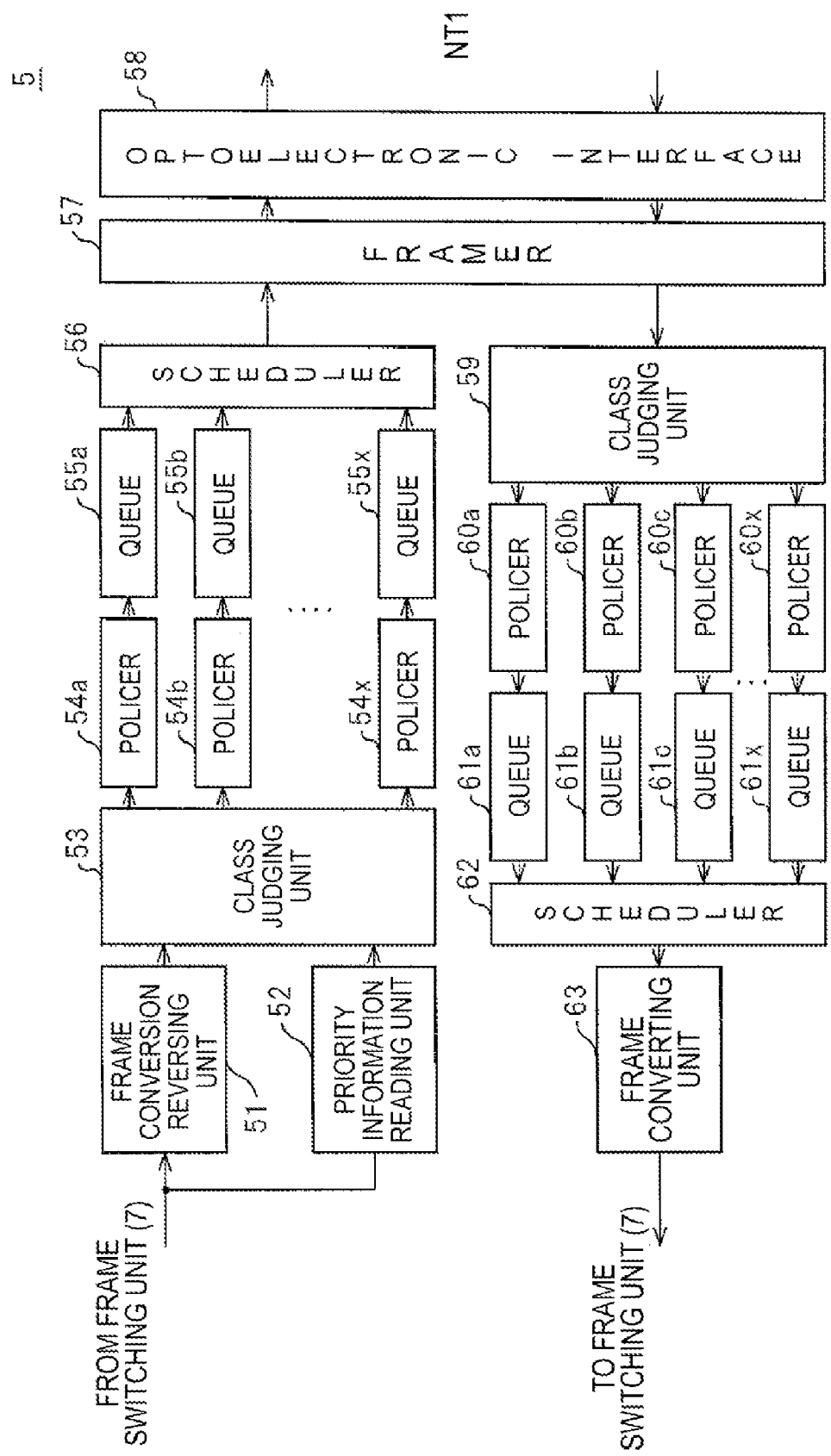
FIG. 15 is a block diagram showing a first example construction of a low-speed interface shown in FIG. 7.

FIG. 15 is a block diagram showing a first example construction of a low-speed interface 5 shown in FIG. 7. As shown in FIG. 15, the low-speed interface 5 has substantially the same construction as the high-speed interface 3 described with reference to FIG. 14. The low-speed interface 5 includes a frame conversion reversing unit 51 for recovering the original MAC frame (see FIG. 8A) by removing the frame switching unit path selection-use header and the PAD data from the MAC frame (see FIG. 9A) received from the high-speed interface 3 or the RPR processing unit 1 via the frame switching unit 7, a priority information reading unit 52 for reading the priority information included in the removed frame switching unit path selection-use headers, a class judging unit 53 for classifying the recovered frames according to an order of priority indicated by the above-described priority information, queues 55a through 55x for storing the classified frames in respective classes, policers 54a through 54x for discarding frames inputted to the queues 55a through 55x to prevent overflow of the queues 55a through 55x, and a scheduler 56 for sequentially selecting frames for transmission over the RPR network RN based on a level of priority for each class of frame stored in the queues 55a through 55x.

The low-speed interface 5 further includes a framer 57 for performing framing processing to convert the MAC frames to frames for transmission over the optical communications network and deframing processing to convert frames received over the optical communications network to MAC frames, and an optoelectronic interface 58 for converting between electronic and optical signals.

The low-speed interface 5 further includes a class judging unit 59 for classifying frames received from the external network NT1 according to an order of priority, queues 61a through 61x for storing the classified frames in respective classes, policers 60a through 60x for discarding frames inputted to the queues 61a through 61x to prevent overflow of the queues 61a through 61x, and a scheduler 62 for sequentially selecting frames for transmission to the frame switching unit 7 based on levels of priority of the classes of the frames stored in the queues 61a through 61x.

The low-speed interface 5 further includes a frame converting unit 63 for appending the frame switching unit path selection-use header and the PAD data to the frames to be transmitted from the scheduler 62 to the frame switching unit 7.

Figure 10:
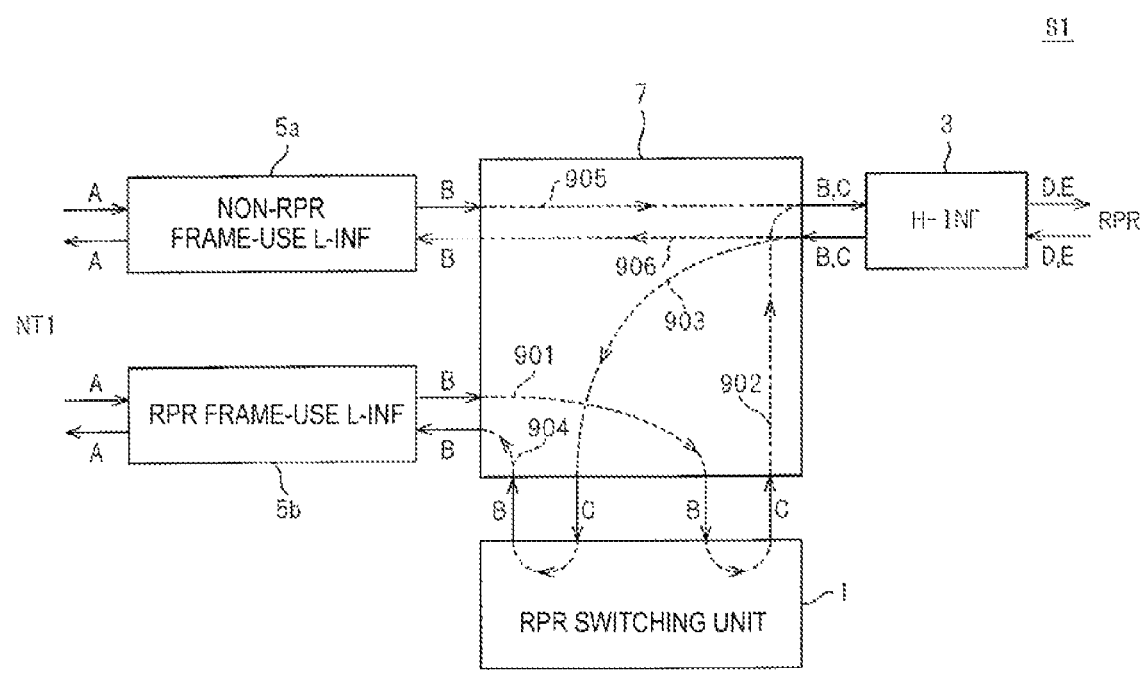
FIG. 10 shows a first example of a frame path in the station apparatus according to the embodiment.
Figure 11A:
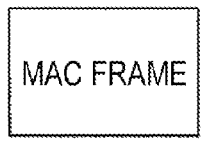
FIG. 11A shows frame formats for each of the units in FIG. 10.
Figure 11B:
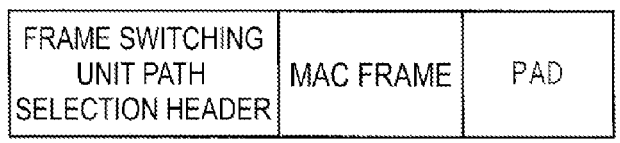
FIG. 11B shows frame formats for each of the units in FIG. 10.
Figure 11C:
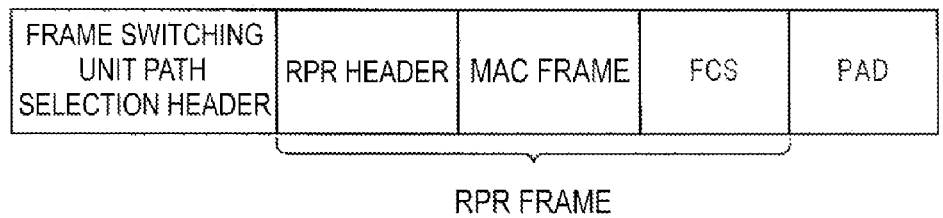
FIG. 11C shows frame formats for each of the units in FIG. 10.
Figure 11D:
FIG. 11D shows frame formats for each of the units in FIG. 10.
Figure 11E:
FIG. 11E shows frame formats for each of the units in FIG. 10.

Here, the frame converting unit 63 of the low-speed interface 5b shown in FIG. 10 (i.e. the low-speed interface 5b that deals with MAC frames to be encapsulated in RPR frames) supplies the destination address of the connection port of the frame switching unit 7 known to connect to the RPR processing unit 1 to the frame switching unit path selection-use header.

Thereafter, when the MAC frame is outputted to the frame switching unit 7, the frame switching unit 7 transmits the MAC frame to the connection port indicated by the destination address included in the frame switching unit path selection-use header. Consequently, the MAC frame is transmitted to the RPR processing unit 1.

The frame converting unit 63 of the low-speed interface 5a shown in FIG. 10 (i.e. the low-speed interface 5a that deals with MAC frames to be transmitted in an unaltered state as non-RPR frames on the RPR network RN) supplies the destination address of a connection port of the frame switching unit 7 known to connect to the high-speed interface 3 to the frame switching unit path selection-use header.

Thereafter, when the MAC frame is outputted to the frame switching unit 7, the frame switching unit 7 transmits the MAC frame to the connection port indicated by the destination address included in the frame switching unit path selection-use header. Consequently, the MAC frame is transmitted to the high-speed interface 3.

Here, when the frame converting unit 63 of the low speed interface 5a supplies the priority information to the frame switching unit path selection-use header, a later-described frame converting unit 27 (see FIG. 17) of the RPR processing unit 1 sets the level of priority to be lower than the level of priority assigned to the priority information of the RPR frames. As a result of setting the priority information in this way, the class judging unit 33 of the high-speed interface 3 shown in the above-described FIG. 14 inputs RPR frames received from the RPR processing unit 1 to a queue which has higher level priority than the queue for the MAC frames received from the low-speed interface 5a.

As described above, the level of priority of the priority information assigned to the non-RPR frames by the frame converting unit 48 of the high-speed interface 3 is preset to be lower than the level of priority assigned by the frame converting unit 27 (see FIG. 17) to the non-RPR frames outputted to the low-speed interface 5 from the RPR processing unit 1. Consequently, the class judging unit 53 of the low-speed interface 5 inputs frames dropped by the RPR processing unit 1 from the RPR network to a queue which has a higher level of priority than the queue for non-RPR frames being transmitted from the high-speed interface 3 to the low-speed interface 5.

Figure 16:
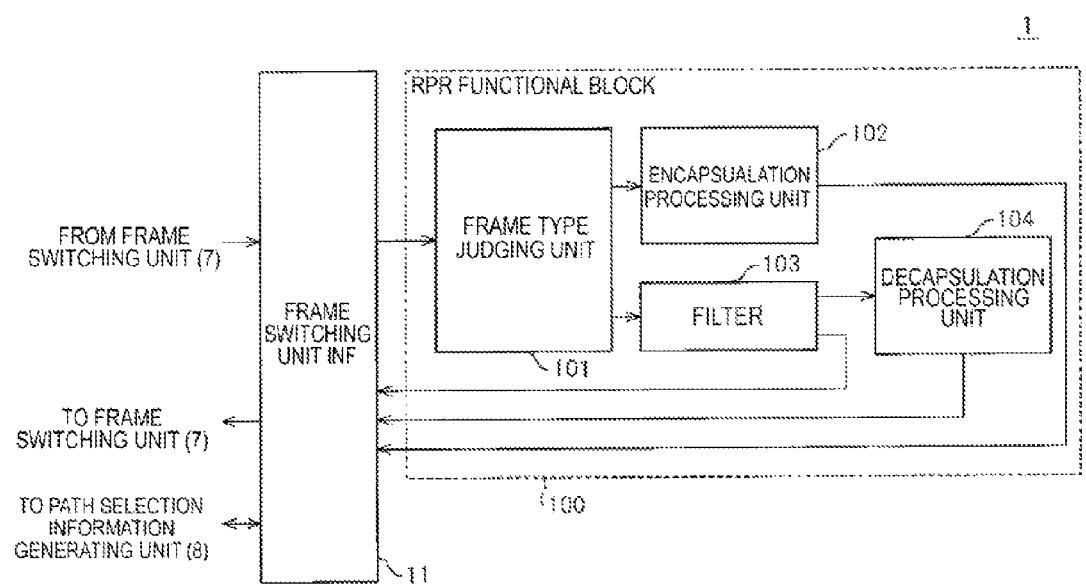
FIG. 16 is a block diagram showing an example construction of an RPR processing unit shown in FIG. 7.

FIG. 16 is a block diagram showing an example construction of the RPR processing unit 1 shown in FIG. 7. As shown in FIG. 16, the RPR processing unit 1 includes a frame switching unit interface 11 for communicating frames with the frame switching unit 7, and an RPR functional block 100 for performing RPR processing on frames received by the frame switching unit interface 11.

The RPR functional block 100 includes a frame type judging unit 101 for judging whether frames received by the frame converting unit interface 11 are RPR frames or non-RPR frames, an encapsulation processing unit 102 for encapsulating frames judged to be non-RPR frames in order to form RPR frames, a filter 103 for selecting which frames of the frames judged to be RPR frames are to be dropped (transmitted) to the external network NT1 by the present station S1, and a decapsulation processing unit 104 for decapsulating the selected frames to form non-RPR frames.

The frame type judging unit 101 may judge whether the frames received by the frame converting unit interface 11 are RPR frames or non-RPR frames by judging, for instance, whether the received frames include an RPR header of a known format.

Figure 17:
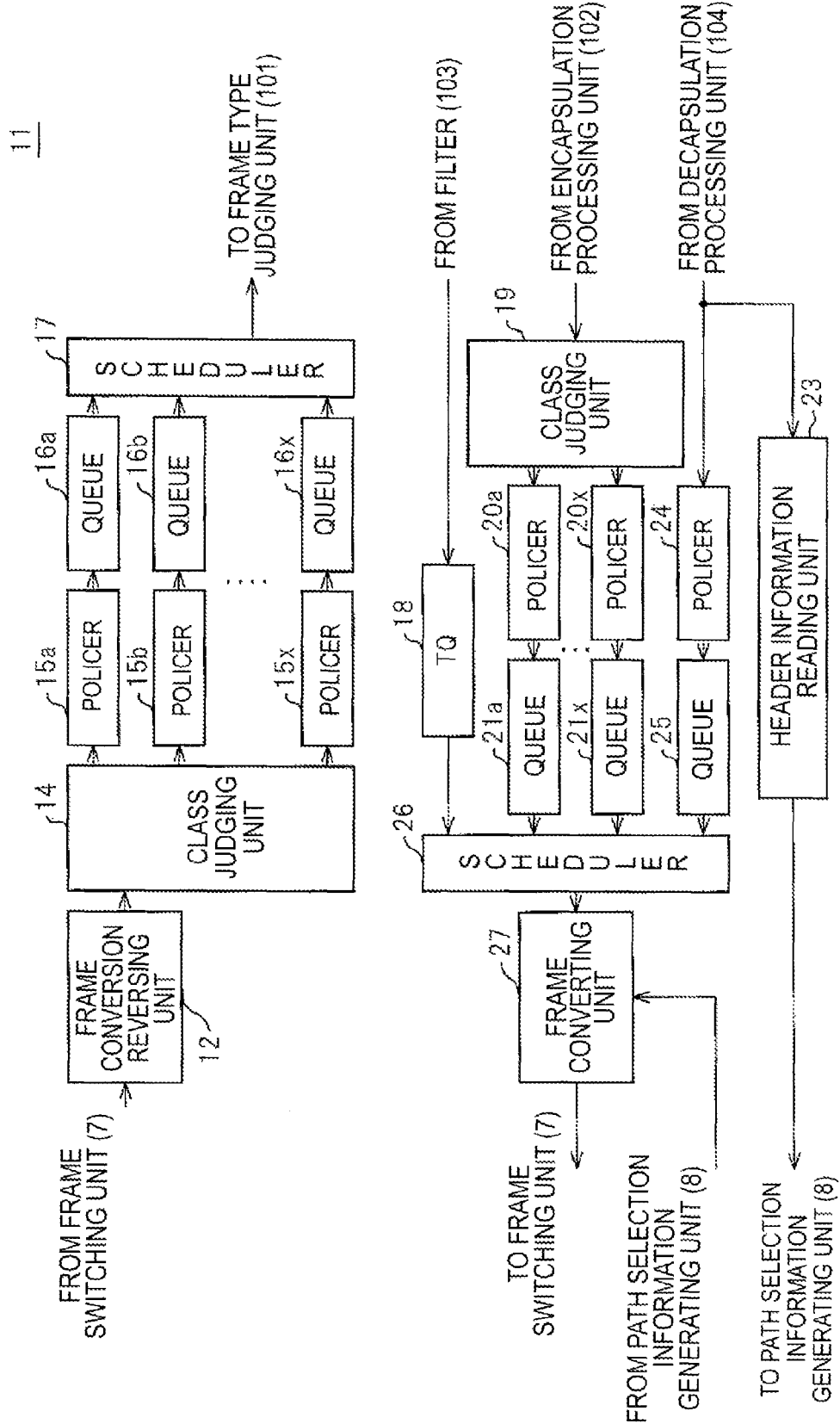
FIG. 17 is a block diagram showing an example construction of a frame switching unit interface shown in FIG. 16.

FIG. 17 is a diagram showing an example construction of the frame converting unit interface 11. As shown in FIG. 17, the frame converting unit interface 11 includes a frame conversion reversing unit 12 for recovering the original RPR frame (see FIG. 8B) by removing the frame switching unit path selection-use header and the PAD data from the RPR frame (see FIG. 9B) received from the high-speed interface 3 via the frame switching unit 7, and for recovering the original MAC frame (see FIG. 8A) from the MAC frame (see FIG. 9A) received from the low-speed interface 5 via the frame switching unit 7. The frame converting unit interface 11 further includes a class judging unit 14 for classifying the recovered frames according to an order of priority, queues 16a through 16x for storing the classified frames in respective classes, policers 15a through 15x for discarding frames inputted to the queues 16a through 16x to prevent overflow of the queues 16a through 16x, and a scheduler 17 for sequentially selecting frames for transmission to the RPR network RN based on a level of priority of the classes of the frames stored in the queues 16a through 16x.

The frame converting unit interface 11 further includes a transit queue (TQ) 18 for storing RPR frames not dropped by the filter 103 until transmission to the ringlet via the high-speed interface 3 and a class judging unit 19 for classifying the RPR frames resulting from encapsulation by the encapsulation unit 102 according to an order of priority. The frame converting unit interface 11 includes queues 21a through 21x for storing the classified frames in separate classes, policers 20a through 20x for discarding frames inputted to the queues 21a through 21x to prevent overflow in the queues 21a through 21x, a queue 25 for storing non-RPR frames resulting from decapsulation by the decapsulation unit 104, a policer 24 for discarding frames inputted to the queue 25 to prevent frame overflow in the queue 25, the transit queue 18, and a scheduler 26 for sequentially selecting frames for transmission to the frame switching unit 7 from among the frames stored in the transit queue 18, the queues 21a through 21x, and the queue 25.

The frame converting unit interface 11 further includes the frame converting unit 27 for appending the frame switching unit path selection-use header and the PAD data to the frames extracted from the transit queue 18, the queues 21a through 21x, and the queue 25 by the scheduler 26, and a header information reading unit 23 for reading the destination MAC address, the transmission source MAC address and the VLAN tag of the dropped non-RPR frames outputted from the decapsulation processing unit 104 and passing the read information to the path selection information generating unit 8.

On receipt of the destination MAC address read by the header information reading unit 23, the path selection information generating unit 8 searches the "transmission source MAC address" column in the address table 81 shown in FIG. 12 using the destination MAC address as the search key. The path selection information generating unit 8 then acquires the connection port address stored in the "destination address for corresponding low-speed interface" column of the record hit by the search. The path selection information generating unit 8 then passes the acquired connection port address to the frame converting unit 27. At this point, the path selection information generating unit 8 may use the VLAN tag information as the search key in place of the destination MAC address.

On receipt from the scheduler 26 of the non-RPR frame extracted from the queue 25, the frame converting unit 27 supplies the connection port address received from the path selection information generating unit 8 as the destination address in the frame switching unit path selection-use header appended to the frame.

Thereafter, when the non-RPR frame is outputted to the frame switching unit 7, the frame switching unit 7 transmits the non-RPR frame to the connection port indicated by the destination address included in the frame switching unit path selection-use header. Consequently, the non-RPR frame is transmitted to the low-speed interface 5 which communicates with the client apparatus indicated by the same destination MAC address.

When the frame outputted by the scheduler 26 is an RPR frame taken from the transit queue 18 or the queues 21a to 21x, the frame converting unit 27 supplies the known connection port address of the frame switching unit 7 connection port which connects to the high speed interface 3 as the destination address in the frame switching unit path selection-use header appended to the frame.

Thereafter, when the RPR frame is outputted to the frame switching unit 7, the frame switching unit 7 transmits the RPR frame to the connection port indicated by the destination address included in the frame switching unit path selection-use header. Consequently, the RPR frame is transmitted to the high-speed interface 3.

Here, when assigning the priority information to the frame switching unit path selection-use header appended to the RPR frame, the above-described frame converting unit 27 sets a higher level of priority than the level of priority in the priority information assigned to the non-RPR frames by the frame converting unit 63 of the low-speed interface 5a.

Moreover, when assigning the priority information to the frame switching unit path selection-use header appended to the non-RPR frame, the frame converting unit 27 sets a higher level of priority than the level of priority assigned to the priority information of the non-RPR frames by the frame converting unit 48 of the high-speed interface 3.

Figure 18:
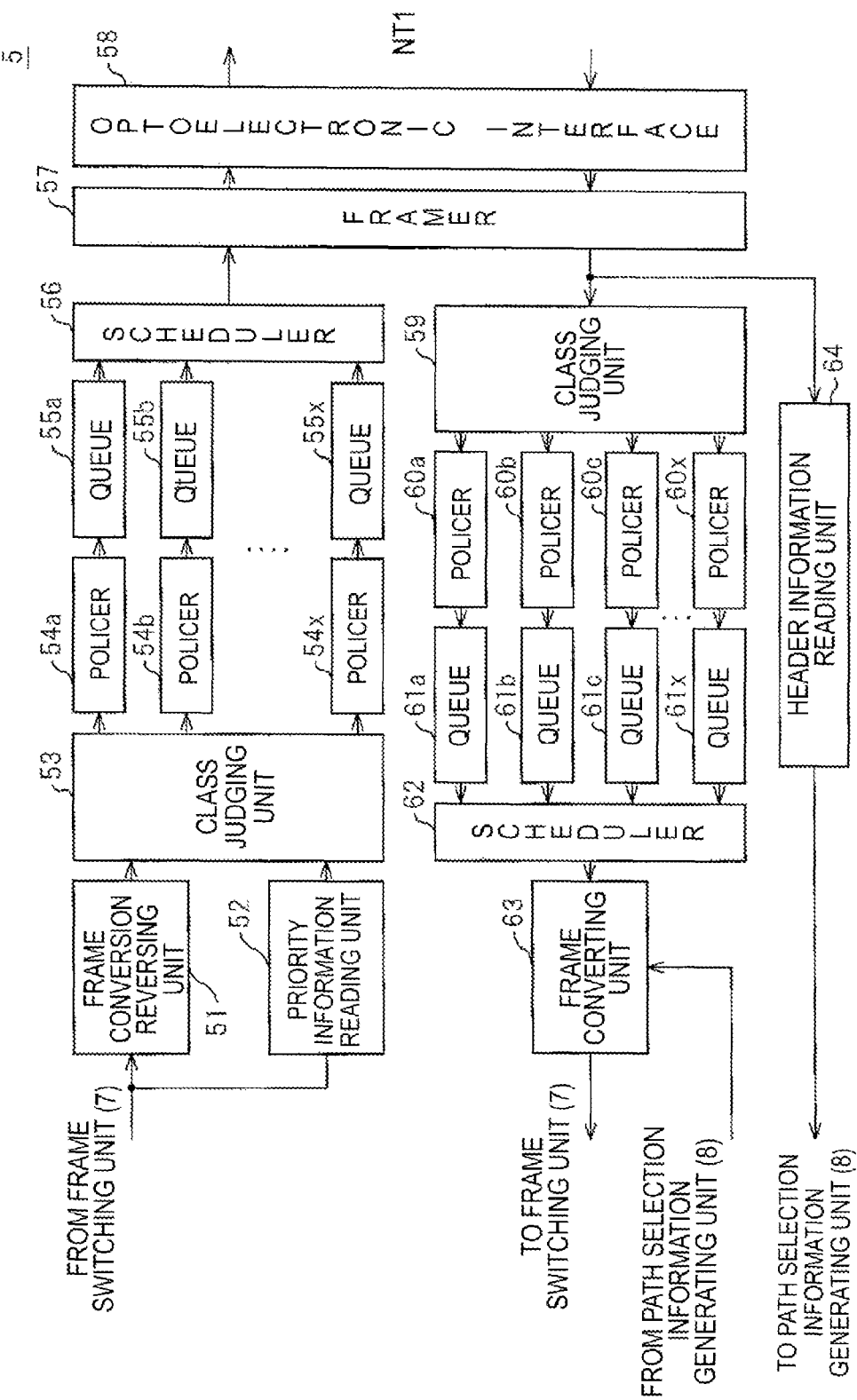
FIG. 18 is a block diagram showing a second example construction of a low-speed interface shown in FIG. 7.

FIG. 18 is a block diagram showing a second example construction of the low-speed interface 5 shown in FIG. 7. In the construction described with reference to FIG. 10, the low-speed interface 5b for dealing with MAC frames which are to be converted to RPR frames and the low-speed interface 5a for dealing with MAC frames which are not to be converted to RPR frames are provided as separated units. However, the low-speed interface 5 can, by judging whether or not the MAC frames are to be converted to RPR frames based on information such as the MAC address and the VLAN tag included in the MAC frames, use the same low-speed interface 5 to deal with both the MAC frames to be converted to RPR frames and the MAC frames not to be converted.

Hence, the low-speed interface 5 shown in FIG. 18 includes a header information reading unit 64 for reading the destination MAC address, the transmission source MAC address, and the VLAN tag of the frames received from the external network NT1, and passing the read information to the path selection information generating unit 8.

The path selection information generating unit 8 searches the "transmission source MAC address" column in the address table 81 shown FIG. 12 using the transmission source MAC address as the search key and acquires the frame conversion requirement information stored in the "RPR" column of the record hit by the search. The path selection information generating unit 8 may also search the "VLAN tag" column of the address table 81 using the "VLAN tag" as the search key, and acquire the frame conversion requirement information stored in the "RPR" column of the record hit by the search. At this time, the path selection information generating unit 8 may make use of the transmission source MAC address and the VLAN tag simultaneously as the search key.

Alternatively, the path selection information generating unit 8 may search the "destination MAC address" column in the conversion requirement judgment table 82 using the destination MAC address as the search key, and acquire the frame conversion requirement information stored in the "RPR" column of the record hit by the search. The path selection information generating unit 8 then judges whether the MAC frame is to be converted to an RPR frame based on the acquired frame conversion requirement information.

When it is judged by the path selection information generating unit 8 that the frame supplying the frame switching unit path selection-use header is to be converted to an RPR frame, the frame converting unit 63 assigns a destination address for the RPR processing unit 1 as the destination address for inclusion in the frame switching unit path selection-use header.

Thereafter, when the frame is outputted to the frame switching unit 7, the frame switching unit 7 transmits the frame to the connection port indicated by the destination address included in the frame switching unit path selection-use header. Consequently, the frame is transmitted to the RPR processing unit 1.

On the other hand, when it is judged by the path selection information generating unit 8 that the frame supplying the frame switching unit path selection-use header is not to be converted to an RPR frame, the frame converting unit 63 supplies a destination address for the high-speed interface 3 as the destination address for inclusion in the frame switching unit path selection-use header. At this point, the frame converting unit 63 assigns a lower level of priority to the priority information included in the frame switching unit path selection-use header than the priority information assigned to the RPR frames by the frame converting unit 27 of the RPR processing unit 1.

Thereafter, when the frame is outputted to the frame switching unit 7, the frame switching unit 7 transmits the frame to the connection port indicated by the destination address included in the frame switching unit path selection-use header. Consequently, the frame is transmitted to the high-speed interface 3.

Figure 19:
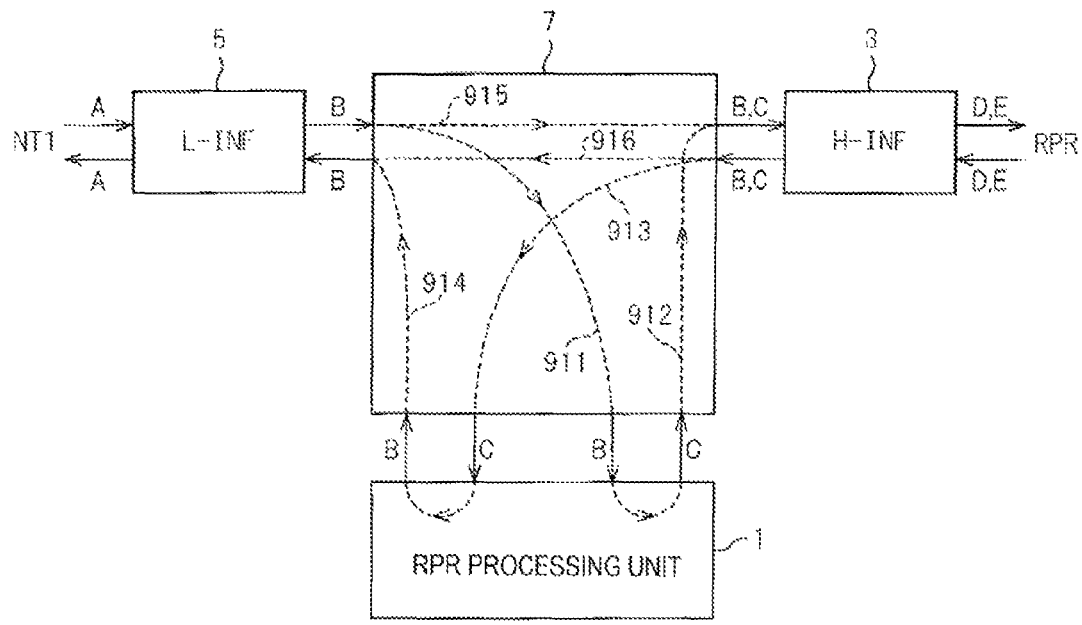
FIG. 19 shows a second example of a frame path in the station apparatus according to the embodiment.

FIG. 19 is a diagram showing frame paths realized by the low-speed interface 5 shown in FIG. 18.

When the low-speed interface 5b outputs a frame that is to be converted to an RPR frame to the frame switching unit 7, the MAC frame is transmitted to the RPR processing unit 1 via a path 911 in the frame switching unit 7 by indicating the connection port connected to the RPR processing unit 1 using the destination address. The RPR processing unit 1 then converts the frames to RPR frames. Then, when the RPR processing unit 1 outputs the frame to the frame switching unit 7, the RPR frame is transmitted to the high-speed interface 3 via a path 912 by indicating the connection port connected to the high speed interface 3 using the destination address. The high-speed interface 3 then transmits the RPR frames to the corresponding ringlet.

On receipt of an RPR frame, the high-speed interface 3 outputs the frame to the frame switching unit 7, indicating a connection port connecting to the RPR processing unit 1 using the destination address. As a result, the RPR frame is transmitted to the RPR processing unit 1 via a path 913. In the RPR processing unit RPR the frame is converted to a non-RPR frame. Then, when the RPR processing unit 1 outputs the MAC frame to the frame switching unit 7, the MAC frame is transmitted to the low-speed interface 5b via a path 914 by indicating the connection port connected to the low-speed interface 5b using the destination address.

When the low-speed interface 5 outputs a frame not to be converted to an RPR frame to the frame switching unit 7, the MAC frame is transmitted directly to the high-speed interface 3 via a path 915 by indicating the connection port connected to the high-speed interface 3 using the destination address, and is transmitted to a ringlet corresponding to the high-speed interface 3 without being converted to an RPR frame.

On receipt of a non-RPR frame from the corresponding ringlet, the high-speed interface 3 outputs the frame to the frame switching unit 7, using the connection port connected to the low-speed interface 5 as the destination address. As a result, the non-RPR frame is transmitted directly to the low-speed interface 5 via the path 916.

The frame formats for each unit A through E of FIG. 19 are substantially the same as the frame formats shown in A through E of FIG. 11.

Figure 20:
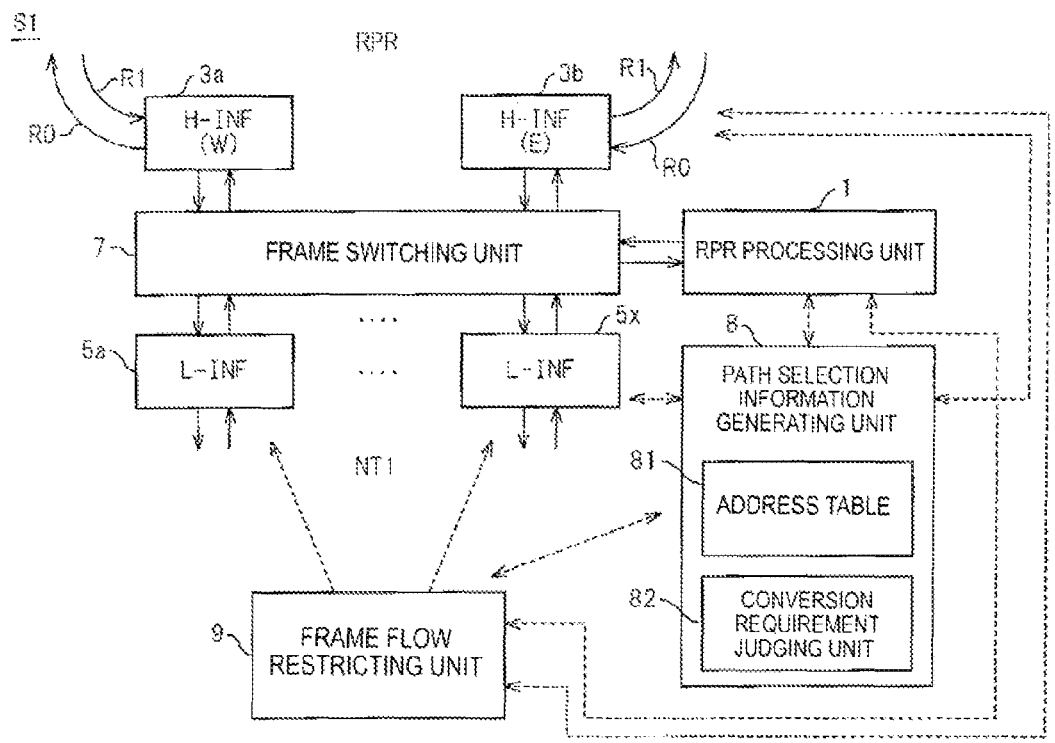
FIG. 20 is a block diagram showing a construction of second embodiment of the station apparatus.
Figure 21:
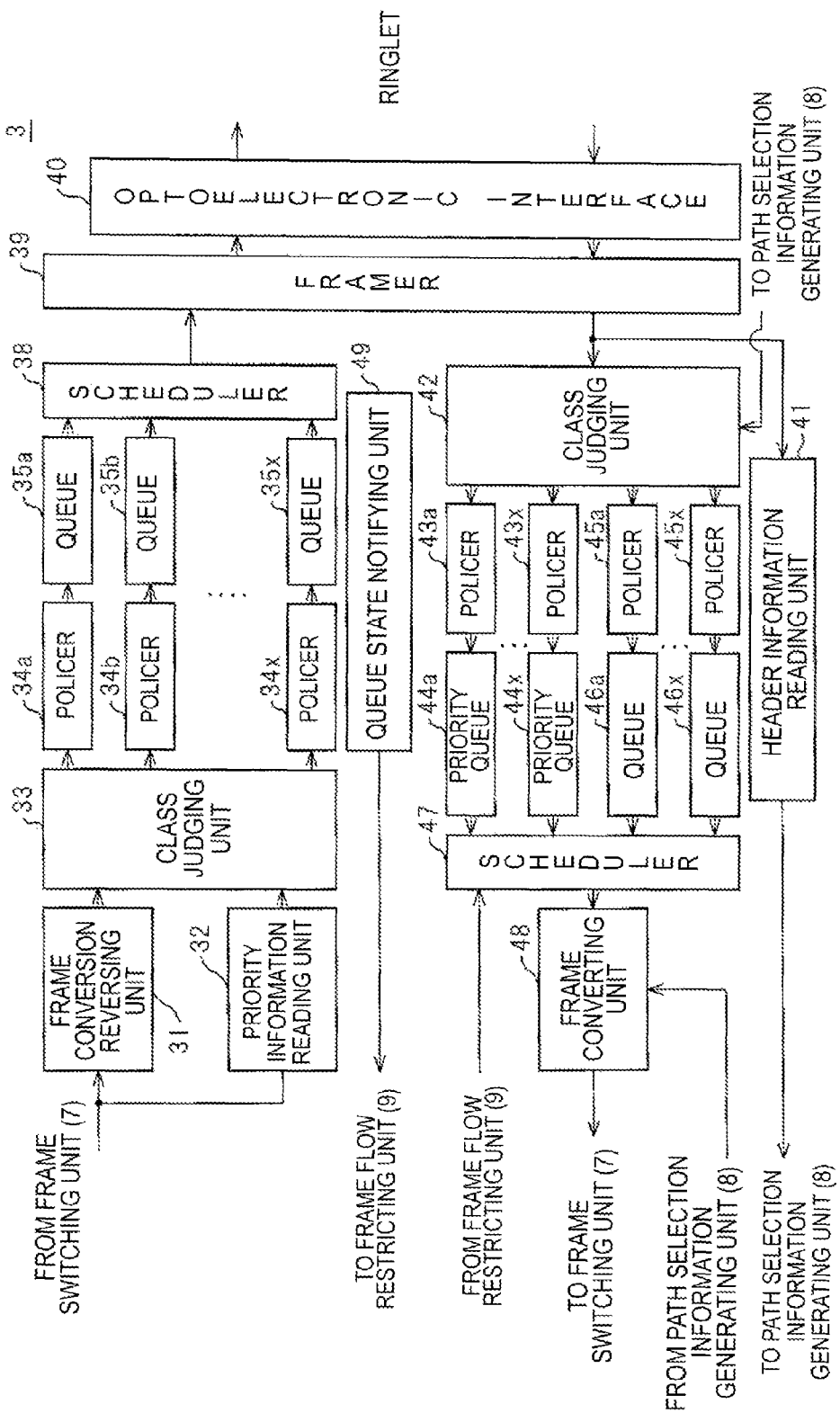
FIG. 21 is a block diagram showing a first example construction of a high-speed interface shown in FIG. 20.
Figure 22:
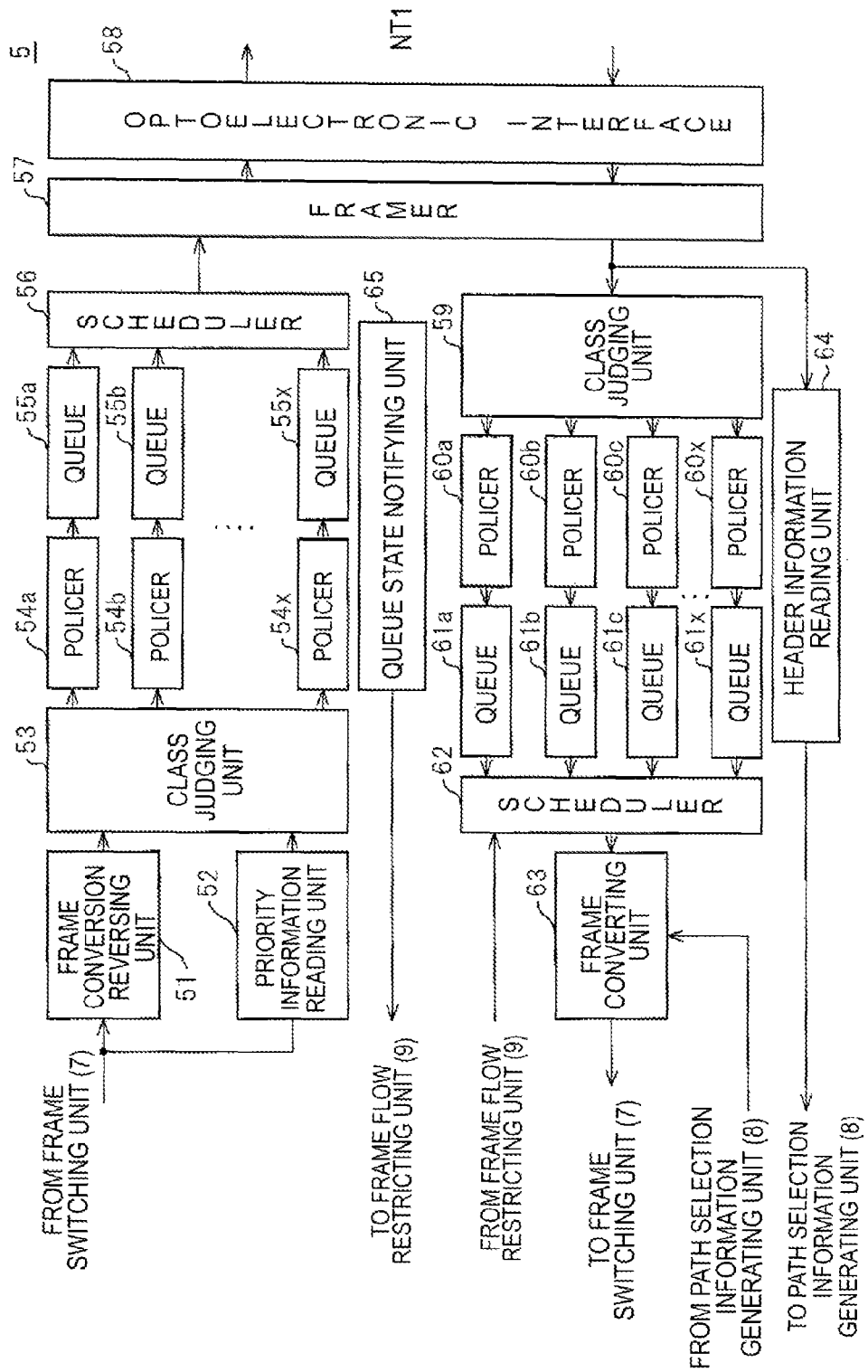
FIG. 22 is a block diagram showing an example construction of a low-speed interface shown in FIG. 20.
Figure 23:
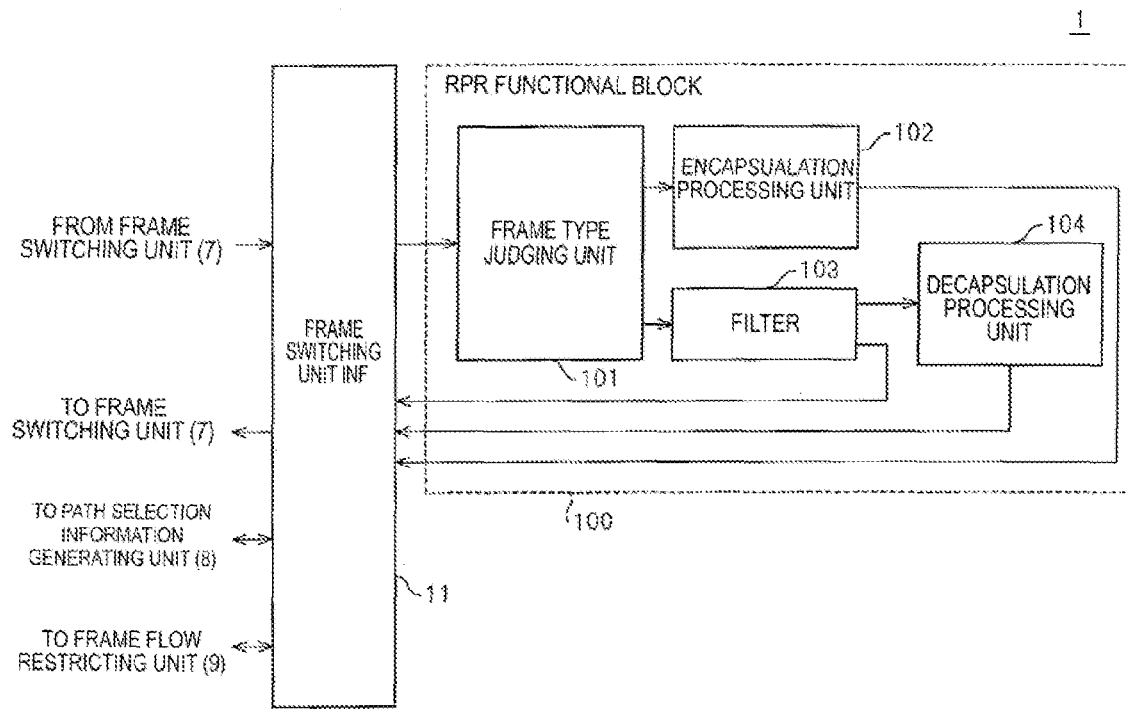
FIG. 23 is a block diagram showing an example construction of an RPR processing unit shown in FIG. 20.
Figure 24:
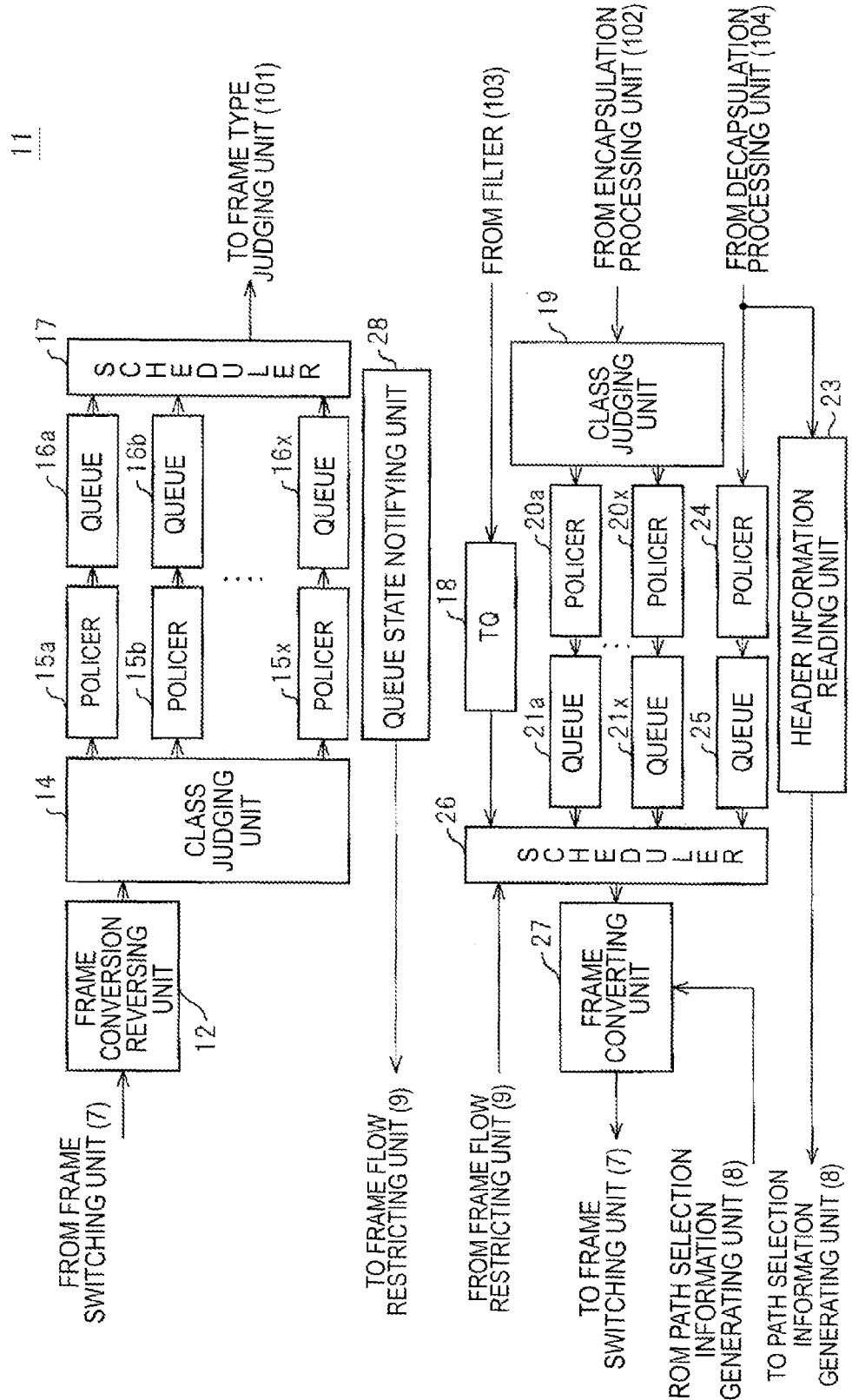
FIG. 24 is a block diagram showing an example construction of a frame switching unit interface shown in FIG. 23.

FIG. 20 is a block diagram showing the construction of the second embodiment of a station apparatus according to the present invention, FIG. 21 is a block diagram showing a first construction example of the high-speed interface 3 shown in FIG. 20, FIG. 22 is a block diagram showing an example construction of the low-speed interface 5 shown in FIG. 20, FIG. 23 is a block diagram showing an example construction of the RPR processing unit 1 shown in FIG. 20, and FIG. 24 is a diagram showing a construction example of the frame switching unit interface 11 shown in FIG. 23.

In the present embodiment, each of the units interconnected using the frame switching unit 7 (i.e. the RPR processing unit 1, the high-speed interface 3, and the low-speed interface 5) restricts a flow of frames transmitted to a communicating unit via the switching unit 7 according to an accumulation state of the queues which store frames received by the communicating unit from the frame switching unit 7.

To achieve this, each unit in the station apparatus S1 shown in FIG. 20 includes a frame flow restricting unit 9 for performing processing to restrict the flow of frames transmitted to the frame switching unit 7. The high-speed interface 3 shown in FIG. 21 includes a queue state notifying unit 49 for notifying the frame flow restricting unit 9 of a frame accumulation state in the queues 35a through 35x. The low-speed interface 5 shown in FIG. 22 includes a queue state notifying unit 65 for notifying the frame flow restricting unit 9 of a frame accumulation state in the queues 55a through 55x. The RPR processing unit 1 shown in FIG. 23 and FIG. 24 includes a queue state notifying unit 28 for notifying the frame flow restricting unit 9 of a frame accumulation state in the queues 16a through 16x.

The frame flow restricting unit 9 restricts the flow of frames by restricting frequency of transmission from the RPR processing unit 1, the high-speed interface 3, and the low-speed interface to the frame switching unit 7 by the schedulers 27, 48 and 62 based on the queue states communicated by the queue state notifying units 28, 49, and 65.

To give a specific example, when the queue state notifying unit 49 of the high-speed interface 3 notifies the frame flow restricting unit 9 that the queues 35a through 35x are nearly full, the frame flow restricting unit 9 restricts the frequency of transmission of frames to the high-speed interface 3 by the scheduler 26 of the RPR processing unit 1 and the scheduler 62 of the low-speed interface 5.

Also, when the queue state notifying unit 28 of the RPR processing unit 1 notifies the frame flow restricting unit 9 that the queues 16a through 16x are nearly full, the frame flow restricting unit 9 restricts the frequency of transmission of frames to the RPR processing unit 1 by the scheduler 47 of the high-speed interface 3 and the scheduler 62 of the low-speed interface 5.

Moreover, when the queue state notifying unit 65 of the low-speed interface 5 notifies the frame flow restricting unit 9 that the queues 55a through 55x are nearly full, the frame flow restricting unit 9 restricts the frequency of transmission of frames to the low-speed interface 5 by the scheduler 26 of the RPR processing unit 1 and the scheduler 47 of the high-speed interface 3.

When restricting the flow of frames transmitted from the schedulers 26, 47 and 62 of the RPR processing unit 1, the high-speed interface 3 and the low-speed interface 5 respectively, the frame flow restricting units 9 may give priority to transmission, from the schedulers 26, 47 and 62, of frames targeted for RPR processing by using different levels of restriction for the frames targeted for RPR processing and the frames not targeted for RPR processing.

For instance, of the frames to be transmitted from the scheduler 47 of the high-speed interface 3, the RPR frames to be transmitted to the RPR processing unit 1 may be transmitted with priority over non-RPR frames to be transmitted to the low-speed interface 5.

Also, of the frames to be transmitted from the scheduler 62 of the low-speed interface 5, the MAC frames to be transmitted to the RPR processing unit 1 for conversion to RPR frames may be transmitted with priority over the MAC frames to be transmitted to the high-speed interface 3 which do not undergo RPR conversion.

Moreover, RPR frames to be transmitted to the high-speed interface 3 from the scheduler 26 of the RPR processing unit 1 may be transmitted with priority over the non-RPR frames to be transmitted to the high-speed interface 3 from the scheduler 62 of the low-speed interface 5, and MAC frames resulting from decapsulation of the RPR frames and destined for transmission to the low-speed interface 5 from the scheduler 26 of the RPR processing unit 1 may be transmitted with priority over the MAC frames to be transmitted to the low-speed interface 5 from the scheduler 47 of the high-speed interface 3.

Performing processing to prioritize frames targeted for RPR processing in this way means that, when using the RPR network RN circuit with intermixed RPR frame and non-RPR frame transmission bandwidths, the RPR frames are transmitted with priority even when the volume of frames being transmitted over the RPR network RN becomes large, and it is therefore possible to prevent the destruction of control frames required by the RPR protocol.

Moreover, by editing the content of the address table 81 according to the frame accumulation state in the queues 35a through 35x of the high-speed interface 3, the frame flow controlling unit 9 shown in FIG. 20 can increase or reduce the number of frames addressed to the RPR network RN (i.e. the number of frames for RPR conversion) by the station apparatus S1.

In the present embodiment, since the frames targeted for RPR processing are processed with a higher priority than frames not targeted for RPR processing, when the volume of transmitted frames grows, it ceases to be possible to transmit non-RPR frames to the ringlet.

To deal with this, the frame flow restricting unit 9 changes the values stored in the RPR field of the address table 81 shown in FIG. 12 and FIG. 13, thereby altering the ratio between the number of frames being converted to RPR frames by the RPR processing unit 1 and the number of non-RPR frames being transmitted unaltered to the RPR network RN from the high-speed interface 3. It is consequently possible to reduce the number of RPR frames to be transmitted over the RPR network and increase opportunities for the transmission of non-RPR frames.

Figure 25:
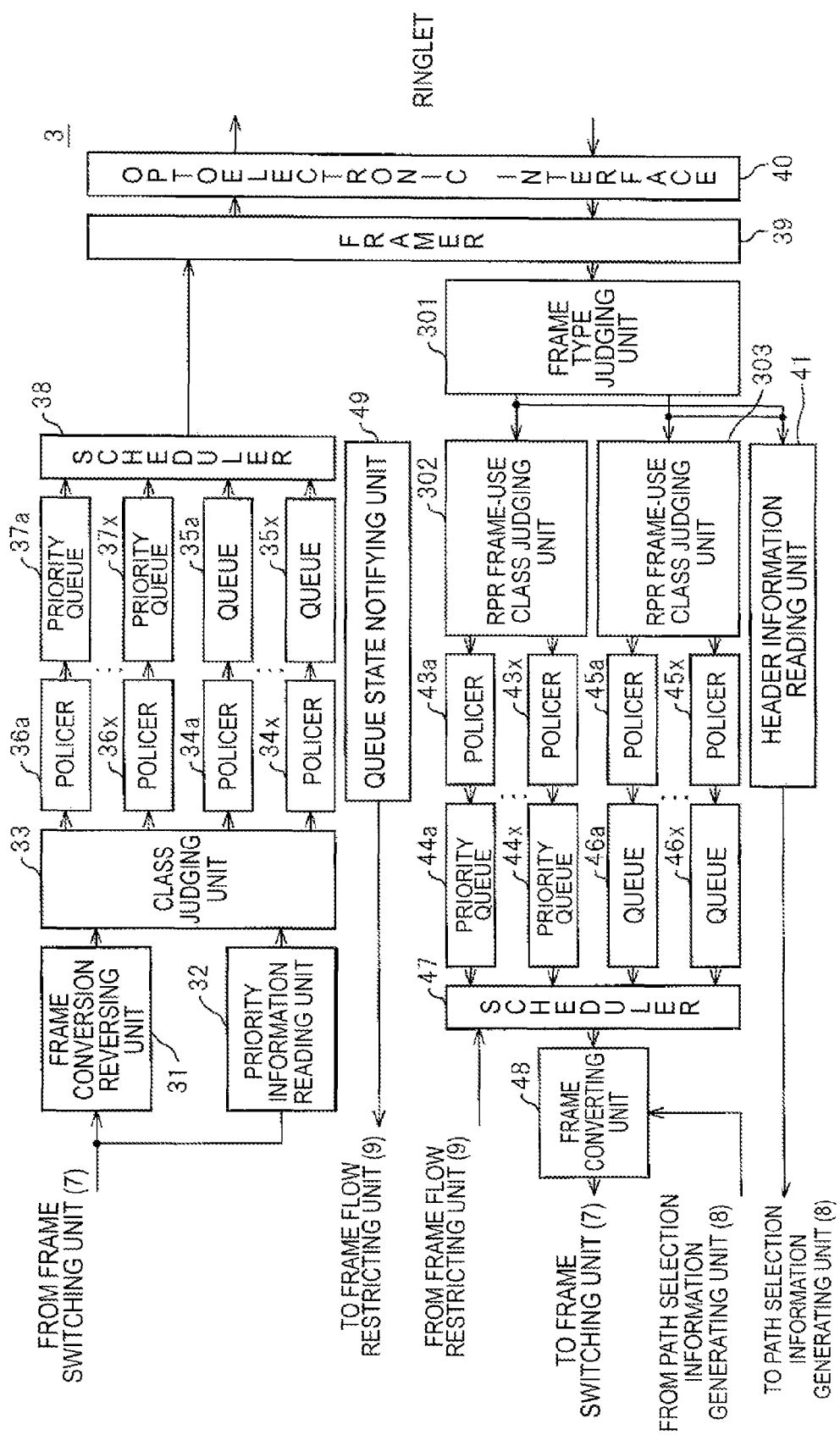
FIG. 25 is a block diagram showing a second example construction of a high-speed interface shown in FIG. 20.

FIG. 25 is a block diagram showing a second example construction of the high-speed interface 3 shown in FIG. 20. The present construction further includes a frame type judging unit 301 for judging whether the frames received from the corresponding ringlet are RPR frames or non-RPR frames. The RPR frames and non-RPR frames are then classified separately using dedicated class judging units 302 and 303.

The frame type judging unit 301 may, for instance, judge whether a frame received from the ringlet is an RPR frame or a non-RPR frame by judging whether the received frame includes an RPR header of a known format.

Figure 26:
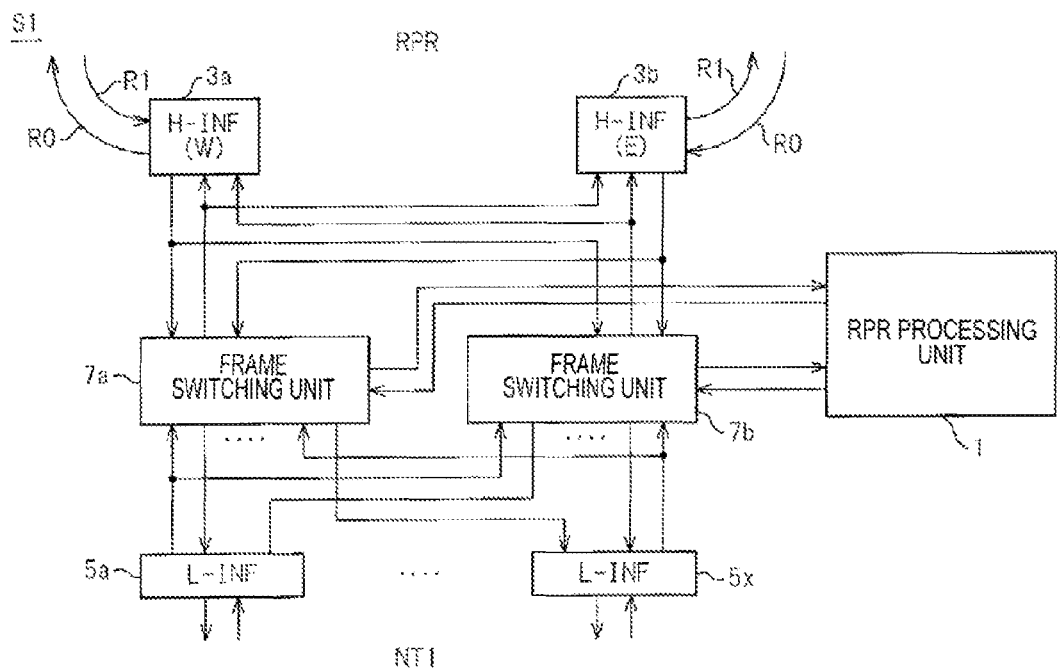
FIG. 26 is a block diagram showing a construction example of a station apparatus with redundancy in the frame switching unit according to an embodiment.
Figure 27:
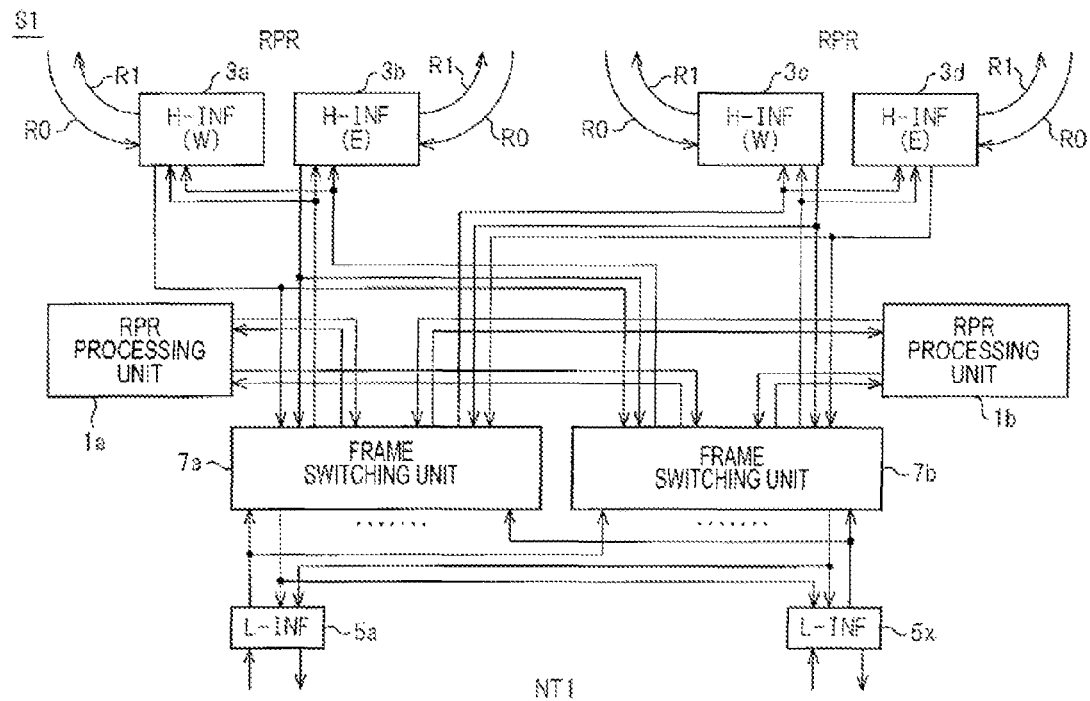
FIG. 27 is a block diagram showing a construction example of a station apparatus according to FIG. 26 with redundancy in the RPR processing unit.

An embodiment of the station apparatus S1 is constructed to include redundancy in order to improve stability. FIG. 26 is a block diagram showing a construction example of a station apparatus with the frame switching unit 7 including redundancy, and FIG. 27 is a block diagram showing a construction example of a station apparatus with the RPR processing unit 1 including redundancy. Note that the path selection information generating unit 8 and the frame flow restricting unit 9 have been omitted from FIG. 26 and FIG. 27, although they may be included in embodiments.

Figure 28:
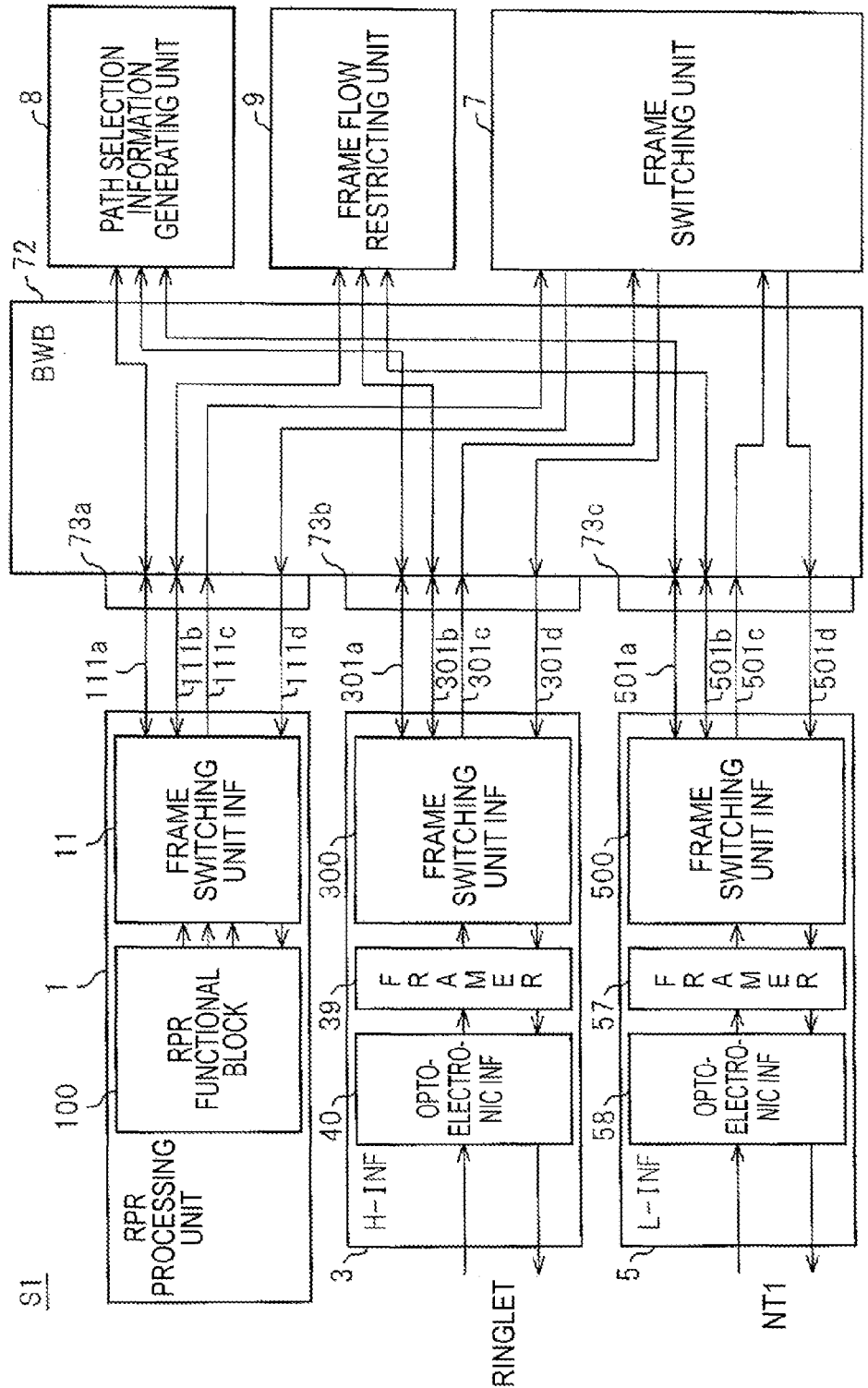
FIG. 28 is a block diagram showing a construction of an embodiment of the station apparatus according to the present invention in a case in which the connectors for connecting the RPR processing unit, the high-speed interface and the low-speed interface to the backboard wiring are pin compatible.

FIG. 28 is a diagram showing a schematic construction of the station apparatus S1 shown in FIG. 20 in the case that the connectors for connecting the RPR processing unit 1, the high-speed interface 3 and the low-speed interface 5 to the backboard wiring 72 of the station device S1 are constructed to be pin compatible.

Figure 29:
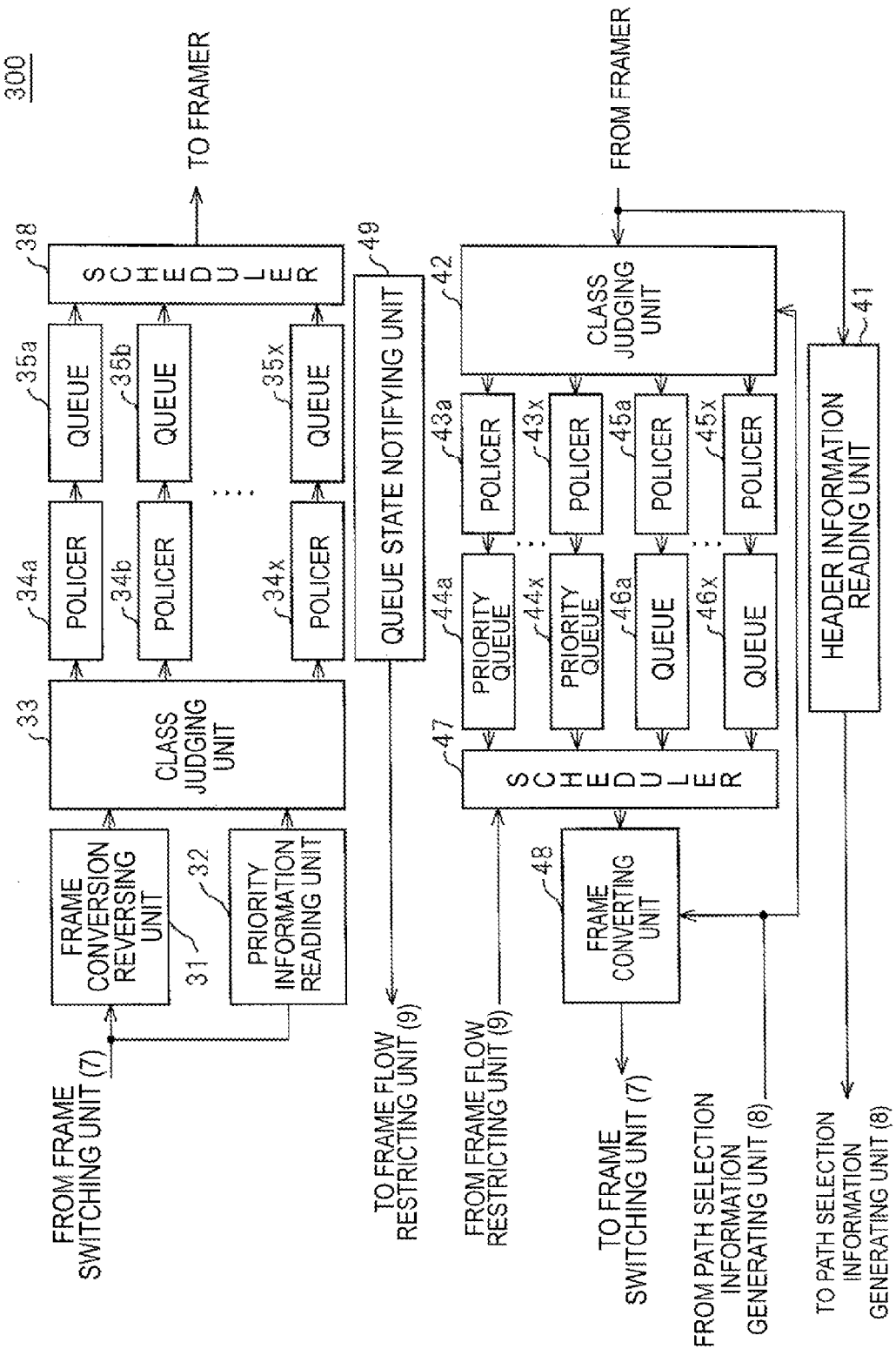
FIG. 29 is a block diagram showing a construction example of a frame switching unit interface of the high-speed interface shown in FIG. 28.

FIG. 29 is a block diagram showing a construction example of a frame switching unit interface 300 of the high-speed interface 3 shown in FIG. 28. FIG. 30 is a block diagram showing a construction example of a frame switching unit interface 500 of the low-speed interface 5 shown in FIG. 28. In FIGS. 28 through 30, the same reference symbols are used for construction elements which are substantially the same as the construction elements shown in FIGS. 20 through 25, so the explanation thereof has been omitted.

As shown in FIG. 28, the backboard wiring (BWB) 72 of the station apparatus S1 includes board-side connectors 73a through 73c and makes electrical connections between each of the connection ports of the frame switching unit 7 and each of the connectors 73a through 73c, between the path selection information generating unit 8 and each of the connectors 73a through 73c, and between the frame flow limiting unit 9 and each of the connectors 73a through 73c.

The RPR processing unit 1, the high-speed interface 3, and the low-speed interface 5 are each constructed as circuit boards for insertion into the motherboard-side connectors. Each has a board-side connector for connection with the motherboard connectors 73a through 73c.

Here, the board-side connectors of the RPR processing unit 1, the high-speed interface 3 and the low-speed interface 5 are constructed to be pin compatible, which is to say, with the same pin-shape and pin-layout.

Frame transmission-use lines 111c and 111d used to transmit frames between the RPR processing unit 1 and the frame switching unit 7, frame transmission-use lines 301c and 301d used to transmit frames between the high-speed interface 3 and the frame switching unit 7, and frame transmission-use lines 501c and 501d used to transmit frames between the low-speed interface 5 and the frame switching unit 7 are constructed so as to connect to pins disposed in corresponding locations in the connectors.

Similarly, control lines 111a, 301a, and 501a for communicating control signals between the RPR processing unit 1 and the path selection information generating unit 8, between the high-speed interface 3 and the path selection information generating unit 8, and between the low-speed interface 5 and the path selection information generating unit 8, respectively, are constructed so as to connect to pins disposed in corresponding locations in the connectors. Also, control lines 111b, 301b, and 501b for communicating control signals between the RPR processing unit 1 and the frame flow restricting unit 9, between the high-speed interface 3 and the frame flow restricting unit 9, and between the low-speed interface 5 and the frame flow restricting unit 9, respectively, are constructed so as to connect to pins disposed in corresponding locations in the connectors.

Thus, since the boards of each of the RPR processing unit 1, the high-speed interface 3, and the low-speed interface 5 are constructed to be pin compatible and interchangeable between the connectors of the backboard wiring board 72 of the station apparatus S1, the numbers of the RPR processing units 1, high-speed interfaces 3, and low-speed interfaces 5 installed in the station apparatus S1 can be easily altered.

For instance, the RPR processing capability of the station apparatus S1 may be expanded by installing a plurality of RPR boards, each of which is an RPR processing unit. With such an arrangement, the transmission bandwidth used by the high-speed interface 3 over the RPR network RN may be divided and each resulting bandwidth portion allocated to a different RPR board.

By increasing the number of RPR boards, it is possible to support an increased amount of RPR processing if, for instance, the RPR protocol is to be further employed in the external network NT1.

In certain embodiments of the present invention, some or all of the method components are implemented as a computer executable code. Such a computer executable code contains a plurality of computer instructions that when performed result in the execution of tasks or processes disclosed herein. Such computer executable code may be available as source code or in object code, and may be further comprised as part of, for example, a portable memory device or downloaded from the Internet, or embodied on a program storage unit or computer readable medium. Furthermore, the principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more CPUs, memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. Explicit use of the term "processor" or "controller" should not be construed to refer exclusively to hardware capable of executing software, and may implicitly include, without limitation, digital signal processor hardware, ROM, RAM, and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A frame transmission apparatus comprising:
   a first interface unit configured to perform frame communication processing with a ring network;
   a second interface unit configured to perform frame communication processing with a different network from the ring network;
   a processing unit configured to convert a frame of a first format from the different network to a frame of a second format;
   a frame switching unit having at least one port coupled to each of the first interface unit, the second interface unit and the processing unit and configured to switch the frame between ports; and
   a table configured to store a set of relationships between frame identification information, an output destination port identifier for an output port in the frame switching unit and frame conversion requirement information, the frame conversion requirement information indicating whether conversion to the frame of the second format is required.

2. The frame transmission apparatus according to claim 1, wherein the frame of the first format is a MAC frame and the frame of the second format is an RPR (Resilient Packet Ring) frame, and the frame identification information is a MAC address or a VLAN address.

3. The frame transmission apparatus according to claim 1, wherein the first interface unit, on receipt of a frame of the first format from the second interface unit and a frame of the second format from the processing unit, gives precedence to the frame of the second format over the frame of the first format in transmission to the ring network.

4. The frame transmission apparatus according to claim 3, wherein the second interface unit and the processing unit each include a priority level information appending unit configured to append priority level information to the frame of the first format and the frame of the second format, a level of priority assigned to the frame of the second format by the priority level information appending unit of the processing unit is higher than a level of priority assigned to the frame of the first format by the priority level appending unit of the second interface unit, and the first interface unit includes a scheduler configured to determine an order of transmission of frames to the ring network in accordance with the priority level information appended to the frames.

5. The frame transmission apparatus according to claim 1, further comprising:
   a frame flow limiting unit configured to limit a flow of transmitted frames of the first format from the second interface to the first interface according to a flow of frames transmitted from the first interface unit to the ring network.

6. The frame transmission apparatus according to claim 1, wherein:
   the second interface unit includes a conversion requirement judging unit configured to judge whether a frame of the first format, received from the different network, to be transmitted to the ring network is to be converted to a frame of the second format.

7. The frame transmission apparatus according to claim 6, wherein the conversion requirement judging unit judges whether to convert the frame of the first format based on one or more of a transmission address, a destination address, tag information, and a level of priority of the frame to be transmitted to the ring network.

8. The frame transmission apparatus according to claim 6, wherein the conversion requirement judging unit dynamically controls a volume of frames for conversion based on a flow of transmitted frames of the second format from the first interface unit to the ring network.

9. The frame transmission apparatus according to claim 1, wherein connectors for connecting the first interface unit, the second interface and the processing unit to backboard wiring of the frame transmission apparatus are interchangeably connectable to connection ports.

10. The frame transmission apparatus according to claim 9, wherein the ring is a RPR (Resilient Packet Ring) network, and a plurality of RPR cards, each acting as the processing unit, are installed in the frame switching unit, and a different one of the RPR cards is allocated to a transmission bandwidth of a plurality of transmission bandwidths used by the first interface to transmit frames.

11. A method of frame transmission in a frame transmission apparatus, the frame transmission apparatus frame communication processing with a ring network and frame communication processing with a different network from the ring network, the method comprising:
   converting, in a processing unit, a frame of a first format from the different network to a frame of a second format different from the first format; frame switching a frame between one of the ring network, the different network, and the processing unit; and
   maintaining a set of relationships between frame identification information, a frame switching identifier for determining where to switch the frame and frame conversion requirement information, the frame conversion requirement information indicating whether conversion to the frame of the second format is required.

12. The method of claim 11, wherein the frame of the first format is a MAC frame and the frame of the second format is an RPR (Resilient Packet Ring) frame, and the frame identification information is a MAC address or a VLAN address.

13. A frame transmission apparatus comprising:
   a first interface unit configured to perform frame communication processing with a ring network; a second interface unit configured to perform frame communication processing with a another network different from the ring network; a processing unit configured to convert a MAC frame to a frame of a second format; and
   a frame switching unit having at least one port coupled to each of the first interface unit, the second interface unit and the processing unit and configured to switch a frame between ports, wherein a set of relationships is maintained between frame identification information, an output destination port identifier for an output port in the frame switching unit and frame conversion requirement information, the frame conversion requirement information indicating whether conversion to the frame of the second format is required.

* * * * *